US011030225B2

(12) United States Patent
Lee et al.

(10) Patent No.: US 11,030,225 B2
(45) Date of Patent: Jun. 8, 2021

(54) GOLF COURSE MANAGEMENT TOOL

(71) Applicant: Game Your Game, Inc., San Francisco, CA (US)

(72) Inventors: Jaehee Lee, San Francisco, CA (US); Francois Haughton, Belfast (GB); Noah Ellman, Berkeley, CA (US); Jeremy Saxton Shaw, Palo Alto, CA (US)

( * ) Notice: Subject to any disclaimer, the term of this patent is extended or adjusted under 35 U.S.C. 154(b) by 0 days.

(21) Appl. No.: 16/252,882

(22) Filed: Jan. 21, 2019

(65) Prior Publication Data

US 2020/0139216 A1    May 7, 2020

Related U.S. Application Data

(60) Provisional application No. 62/621,385, filed on Jan. 24, 2018.

(51) Int. Cl.
*G06F 16/29*   (2019.01)
*G06F 3/0484*  (2013.01)
*A63B 71/06*   (2006.01)
*G09B 29/00*   (2006.01)

(52) U.S. Cl.
CPC .......... *G06F 16/29* (2019.01); *G06F 3/04842* (2013.01); *A63B 2071/0691* (2013.01); *G09B 29/007* (2013.01)

(58) Field of Classification Search
CPC ................. G06F 16/29; G06F 3/04842; A63B 2071/0691; G09B 29/007
See application file for complete search history.

(56) References Cited

U.S. PATENT DOCUMENTS

| | | |
|---|---|---|
| 4,142,236 A | 2/1979 | Martz et al. |
| 5,044,634 A | 9/1991 | Dudley |
| 5,434,789 A | 7/1995 | Fraker et al. |

(Continued)

FOREIGN PATENT DOCUMENTS

| | | |
|---|---|---|
| CN | 1227131 A | 9/1999 |
| CN | 1661747 A | 8/2005 |

(Continued)

OTHER PUBLICATIONS

International Search Report and Written Opinion dated Jan. 23, 2012 for International Application Serial No. PCT/EP2011/063074, International Filing Date: Jul. 29, 2011.

*Primary Examiner* — Roberto Borja
(74) *Attorney, Agent, or Firm* — Young's Patent Services, LLC; Bruce A Young

(57) ABSTRACT

A golf course management tool receives location information from devices associated with golfers as they play golf. The location information includes ball-striking locations and periodically determined locations of the golfer. The location information is stored in a database and is linked to the appropriate golf course. A user is presented with a graphical user interface which presents the location information overlaid on an overhead image of the golf course. The location information is presented in various ways under the control of the user. Statistics are also calculated for the holes and rounds played and presented to the user. The location information can also be filtered in a variety of ways under control of the user to alter the graphical presentation and statistical calculations.

14 Claims, 22 Drawing Sheets

(56) References Cited

U.S. PATENT DOCUMENTS

| | | |
|---|---|---|
| 6,030,109 A | 2/2000 | Lobsenz |
| 6,582,328 B2 | 6/2003 | Kuta et al. |
| 7,118,498 B2 | 10/2006 | Meadows et al. |
| 8,226,495 B2 | 7/2012 | Savarese et al. |
| 8,517,850 B1 | 8/2013 | Beno et al. |
| 8,581,727 B1 | 11/2013 | Koenig et al. |
| 8,617,005 B2 | 12/2013 | Moran et al. |
| 8,624,738 B2 | 1/2014 | Savarese et al. |
| 8,870,673 B2 | 10/2014 | Beno et al. |
| 8,992,347 B2 | 3/2015 | Moran et al. |
| 9,227,118 B2 | 1/2016 | Beno et al. |
| 2005/0184150 A1 | 8/2005 | Welte et al. |
| 2006/0178110 A1 | 8/2006 | Nurminen et al. |
| 2007/0087866 A1 | 4/2007 | Meadows et al. |
| 2009/0017944 A1 | 1/2009 | Savarese et al. |
| 2009/0111602 A1 | 4/2009 | Savarese et al. |
| 2009/0233735 A1 | 9/2009 | Savarese et al. |
| 2009/0298605 A1 | 12/2009 | Wiegers |
| 2010/0144455 A1 | 6/2010 | Ahem |
| 2010/0308105 A1 | 12/2010 | Savarese et al. |
| 2011/0210820 A1 | 9/2011 | Talty et al. |
| 2016/0008694 A1* | 1/2016 | Griffiths ............... G01S 19/19 473/407 |
| 2017/0169363 A1* | 6/2017 | Salmasi ............... G06Q 10/02 |
| 2018/0143998 A1* | 5/2018 | Prahladka ............ G06F 16/29 |

FOREIGN PATENT DOCUMENTS

| | | |
|---|---|---|
| JP | 0615022 | 1/1994 |
| JP | 2004173792 A | 6/2004 |
| JP | 2006338336 A | 12/2006 |
| JP | 2013532568 A | 8/2013 |
| KR | 1025500052542 | 6/2005 |
| KR | 101541980 B1 | 8/2015 |
| WO | 2009009147 | 1/2009 |
| WO | 2012016917 A1 | 2/2012 |

* cited by examiner

GOLF COURSE MANAGEMENT TOOL

CROSS-REFERENCE TO RELATED APPLICATIONS

This application claims the benefit of U.S. Provisional Application 62/621,385 entitled Golf Course Management Tool and filed Jan. 24, 2018. It is also related to U.S. Pat. No. 8,617,005 entitled Golf Data Collection and issued on Dec. 31, 2013. Both of the aforementioned applications are hereby incorporated by reference in their entirety herein for any and all purposes.

BACKGROUND

Technical Field

The present subject matter relates to the game of golf. More specifically, it relates to tools for managing a golf course.

Background Art

There are many aspects to managing a golf course. One aspect is the maintenance of the grounds themselves, including the various areas greens, tee boxes, fairways, rough, and hazards, such as bunkers. Each type of area has unique maintenance requirements and associated costs, including, for example, mowing frequency and speed, irrigation amounts, application frequency and rates for fertilizer, herbicide, and pesticide. Another aspect is maintaining good playing conditions including a fast pace-of-play and appropriate course conditions and layout for the skill level of the golfers using the course.

Historically, greenskeepers and course superintendents have used their experience and local knowledge to determine how to manage the course with very little in the way of detailed analytics of actual rounds of golf played on their course. New tools have appeared in recent years that allow an individual golfer to gather detailed information about their rounds played, such as the Game Golf® Live from Game Your Game, Inc. which is described in part in U.S. Pat. No. 8,617,005. This information has not yet been made available to greenskeepers, course superintendents, and other golf course professionals in a way that it can be used to manage a golf course.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1:
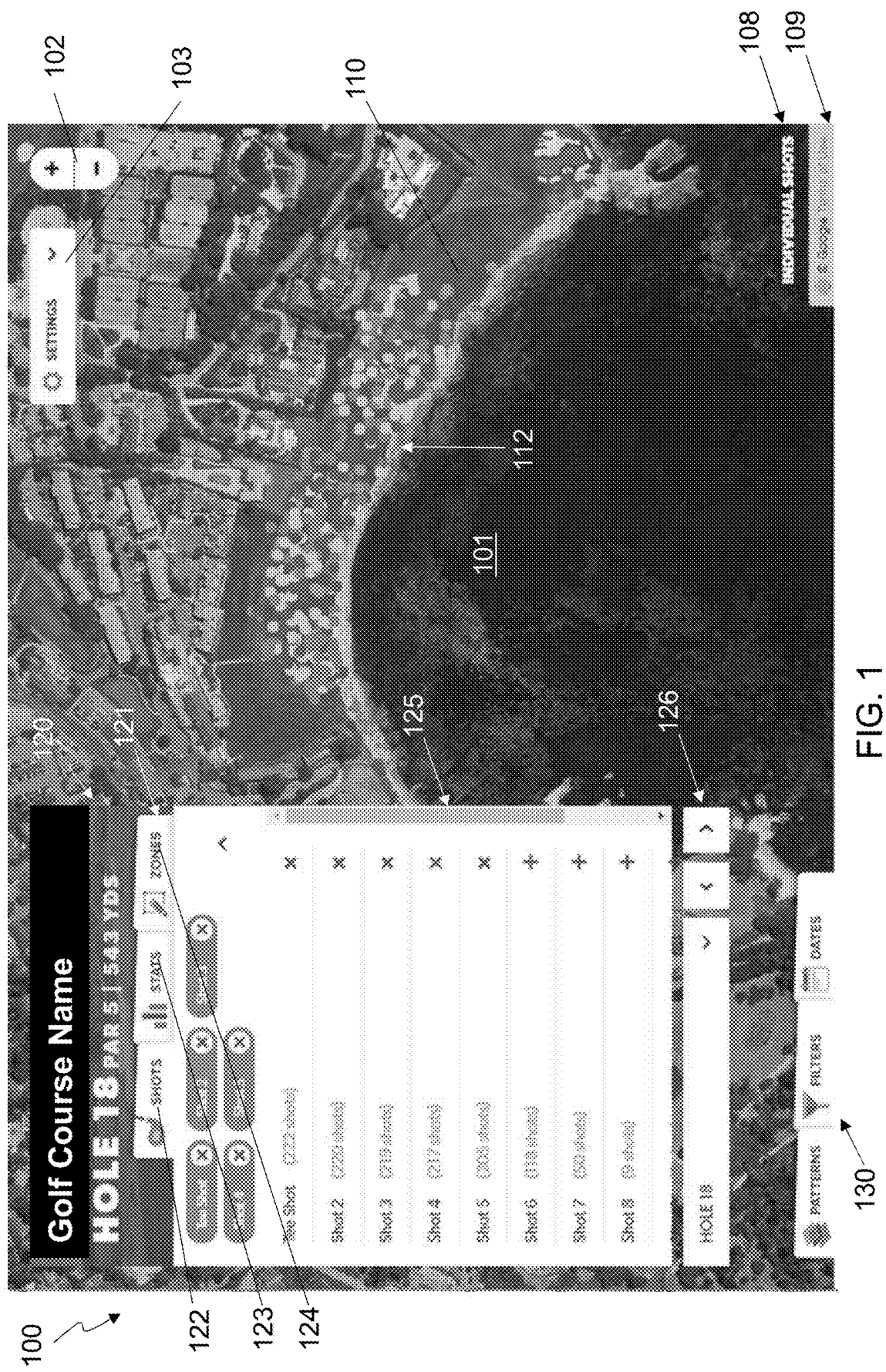
FIG. 1 is a screenshot of an embodiment of a golf course management tool relating to a single hole.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification.

Turning now to a description of the technology disclosed herein, a golfer carries a device which determines the golfer's location at various times. Depending on the embodiments, the device determines a time and location where a golf ball is struck by the golfer on the course and/or the device determines the golfers location on a periodic basis, such as once per second, during the time the golfer is playing a round of golf. In other embodiments, the periodic basis may be faster or slower, such as two or more times per second or every 5 or ten seconds, although some embodiments may determine the golfer's location at a faster or slower rate. The device can determine a ball-striking location using any technology, but in at least some embodiments, a ball strike is determined based at least in part on a time that an radio frequency identification tag (RFID) on a golf club is tagged. The device can upload the location information (i.e. the ball-striking locations, periodically determined locations, and/or other location information related to the golfer during a round of golf) to a server over a network such as over the internet. In some embodiments, the server may be a cloud-based server.

The device may be a stand-alone device with its own location-determining circuitry, such as a GPS receiver or other location determining circuitry, and its own communication circuitry to communicate with the server. In other embodiments, the device may be a smartphone running an app to determine the location using the smartphone's location determining circuitry and the smartphone's data connection. In other embodiments, device may work as an accessory to the smartphone and include some sensor circuitry to help determine ball-striking locations and then communicate with an app on the smartphone to send the data to the server. In such embodiments, the device may include its own location-determining circuitry and/or it may use the location determining circuitry in the smartphone.

Once the server receives the location information from the golfer, it stores the location information into a database where it is linked with the golf course on which the round of golf was played. In some embodiments, the round may be linked with identifying information of the golfer. Each ball-striking event is also linked with a particular hole of the course and a stroke number for that hole. The determination of which hole and stroke number should be linked with the ball-striking event may be made in the server, in the local device, or in the smartphone, depending on the embodiment.

The server can then utilize the location information stored in the database to generate information about rounds played on the course that is useful to course management personnel, such as greenskeepers and course superintendents. The server can make this information available through any mechanism, such as written reports, data to be downloaded for local analysis, and through a web-based browser interface over the internet. Reference now is made in detail to the examples illustrated in the accompanying drawings showing one embodiment of a web-based browser interface to the data which are discussed below.

FIG. 1 is a screenshot 100 of an embodiment of a golf course management tool. The screenshot 100 relates to a single hole 110 of the golf course. The screenshot 100 includes an aerial image 101 of the at least a portion of the golf course that includes the hole 110. The screenshot 100 also includes one or more graphic user interface (GUI) elements, such as zoom controls 102, a settings GUI 103, a first GUI 120, and a second GUI 130. The screenshot also includes a title 108 and a copyright notice 109 in this embodiment.

The settings GUI 103 allows a user to control various settings for the golf course management tool. A pull-down menu from the setting GUI 103 allows the user to switch to a different golf course, provide profile information such as name and contact information as well as preferred units, such as distance units (e.g. yards or meters) and currency (e.g. US Dollars, Euros, or British Pounds), although other preferences could also be included in some embodiments. Some embodiments may also include other items in the setting GUI 103, such as, but not limited to, a help menu, a contact page, and a logout function.

The first GUI 120 of this embodiment includes the name of the golf course and the hole selected with its associated par and yardage at the top of the first GUI 120. The first GUI also includes a tabs area 121 to select between functions of the GUI, an information/selection area 125 that changes depending on the tab selected, and a hole selection area 126 that allows a different hole to be selected. In at least some embodiments, the hole selection area 126 includes next hole and previous hole selection arrows and a pull-down menu to allow any hole to be directly selected.

In the embodiment shown, the tabs area 121 includes three tabs, a SHOTS tab 122, a STATS tab 123 and a ZONES tab 124. The use of the STATS tab 123 is shown in FIG. 5A-D and associated description. The use of the ZONES tab 124 is shown in FIG. 6-9 and associated description. In FIG. 1, the SHOTS tab 122 has been selected in the tabs area 121 of the first GUI 120 so the information/selection area 125 shows which shots are to be shown superimposed on the image 101. Each round of collected data keeps track of where each shot on a particular hole was hit for that round. The selection area 125 allows a user to determine which shots are to be shown. In the example shown in FIG. 1, tee shots (the first shot on a hole), second shots, third shots, fourth shots and fifth shots on the selected hole are selected to be shown as dots 112 superimposed on the image 101. The information/selection area 120 shows all of the possible shot numbers that could be selected for the hole and includes a scroll bar if necessary. Note that in this embodiment, the number of times a particular shot number has been recorded for the hole is also shown and that each shot number may have a different number of due to various reasons such as players stopping play on a hole before it is completed and differing scores for the hole.

Figure 3A:
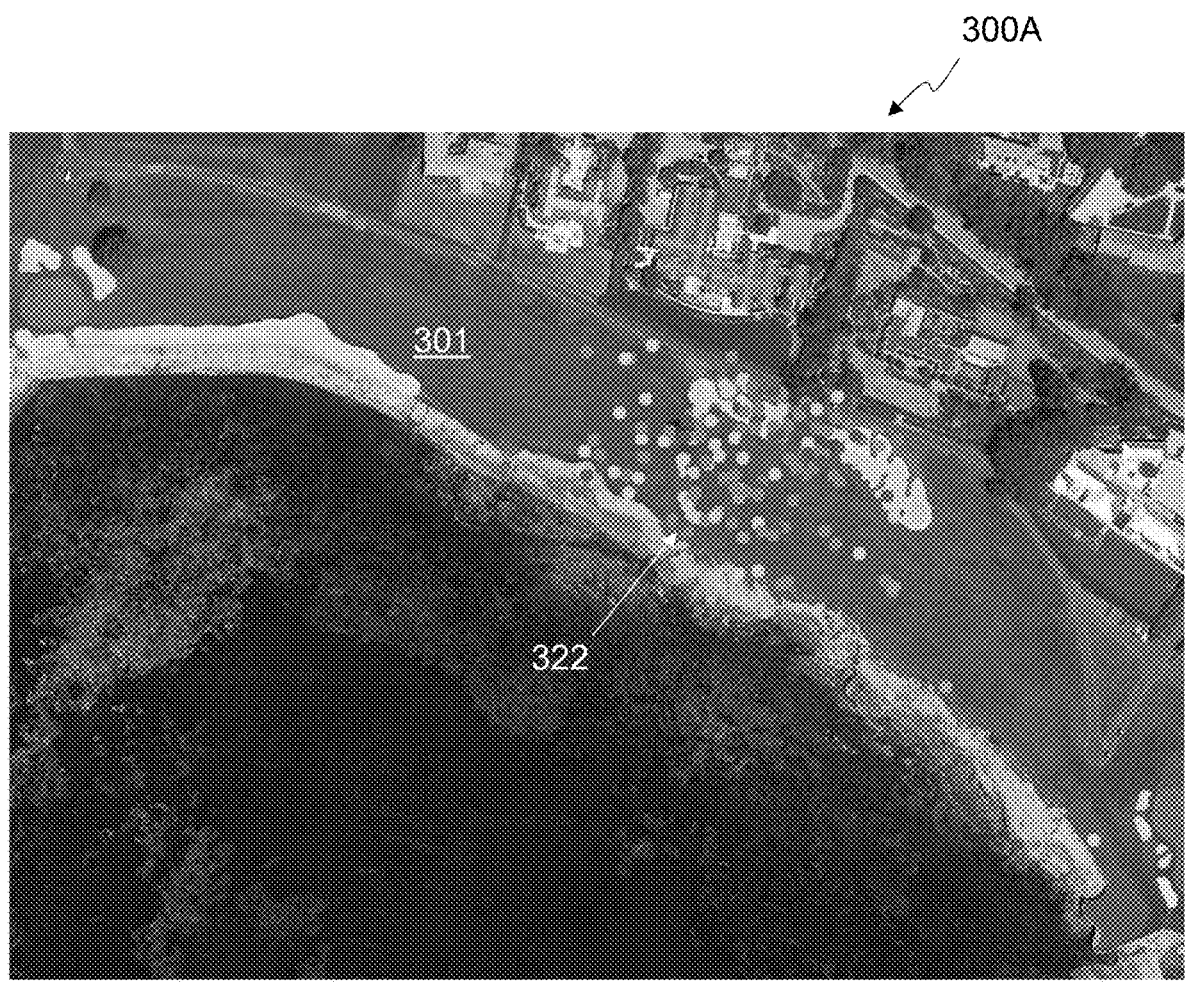
FIG. 3A-D show selected information overlaid on an image of a golf hole in embodiments.
Figure 3B:
Figure 3C:
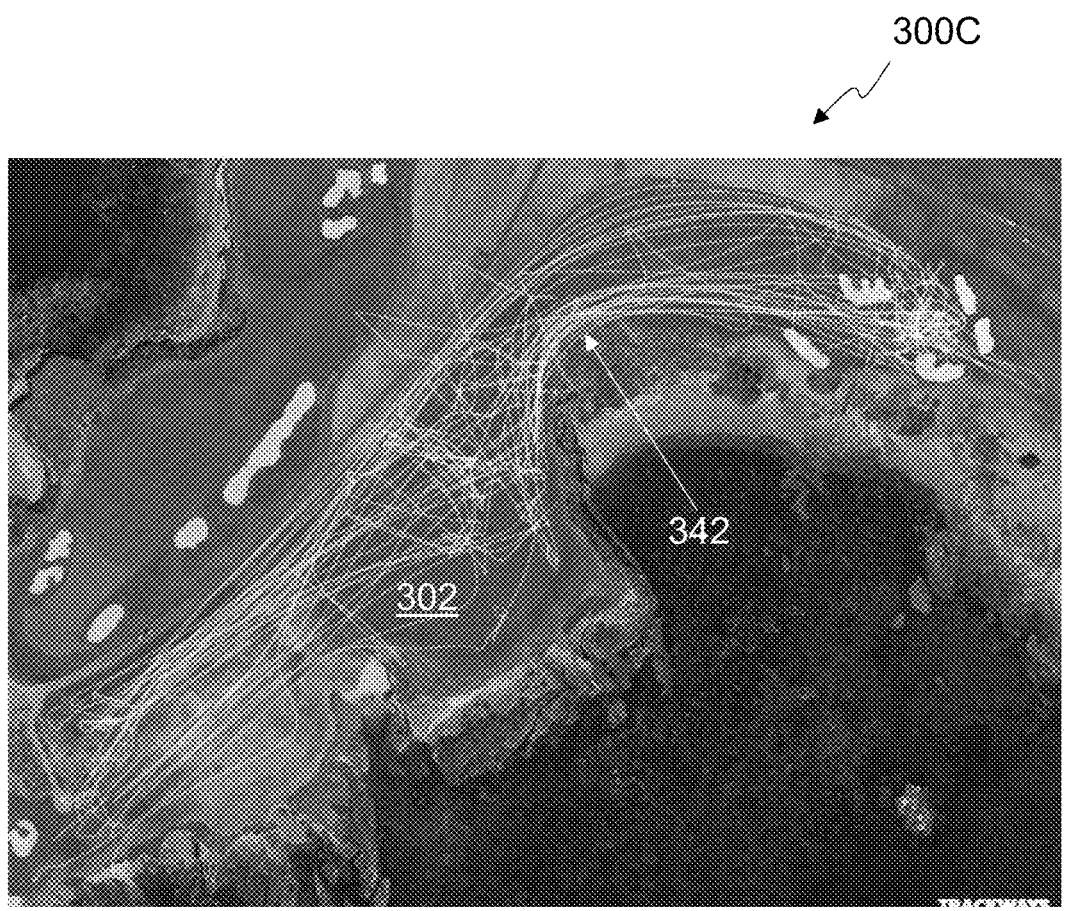
Figure 3D:
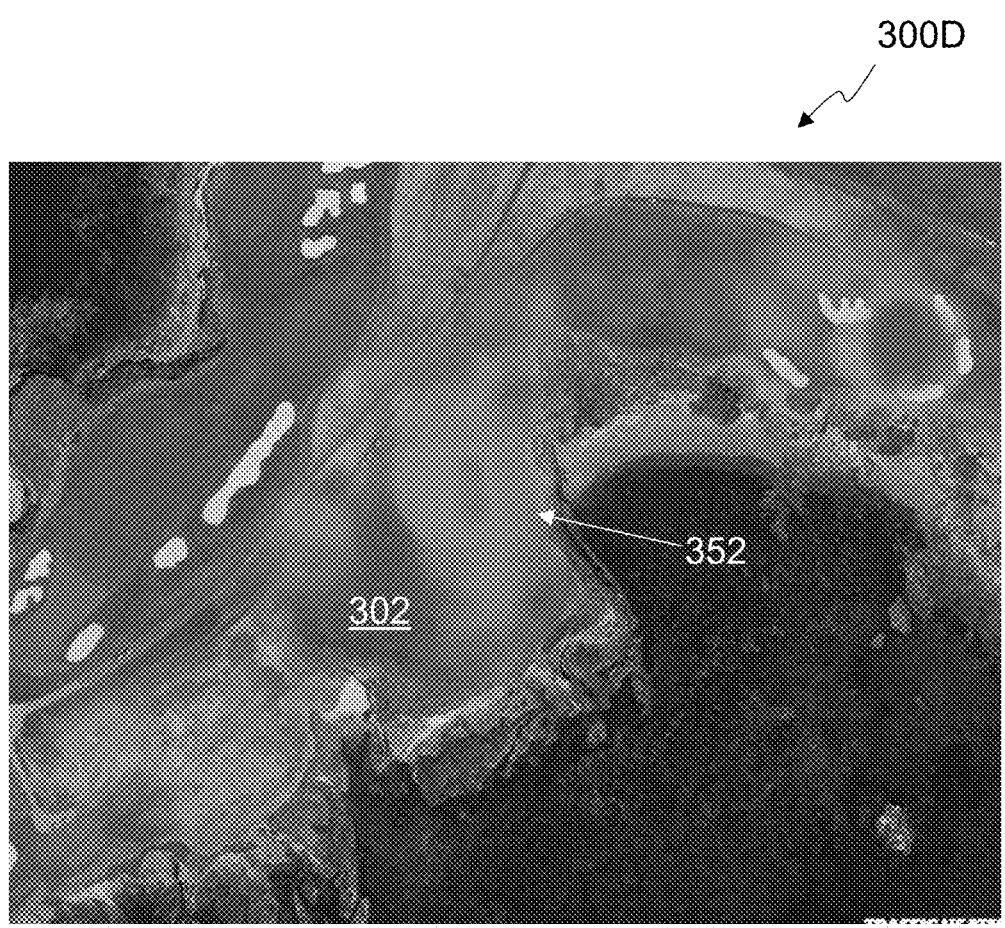
Figure 4:
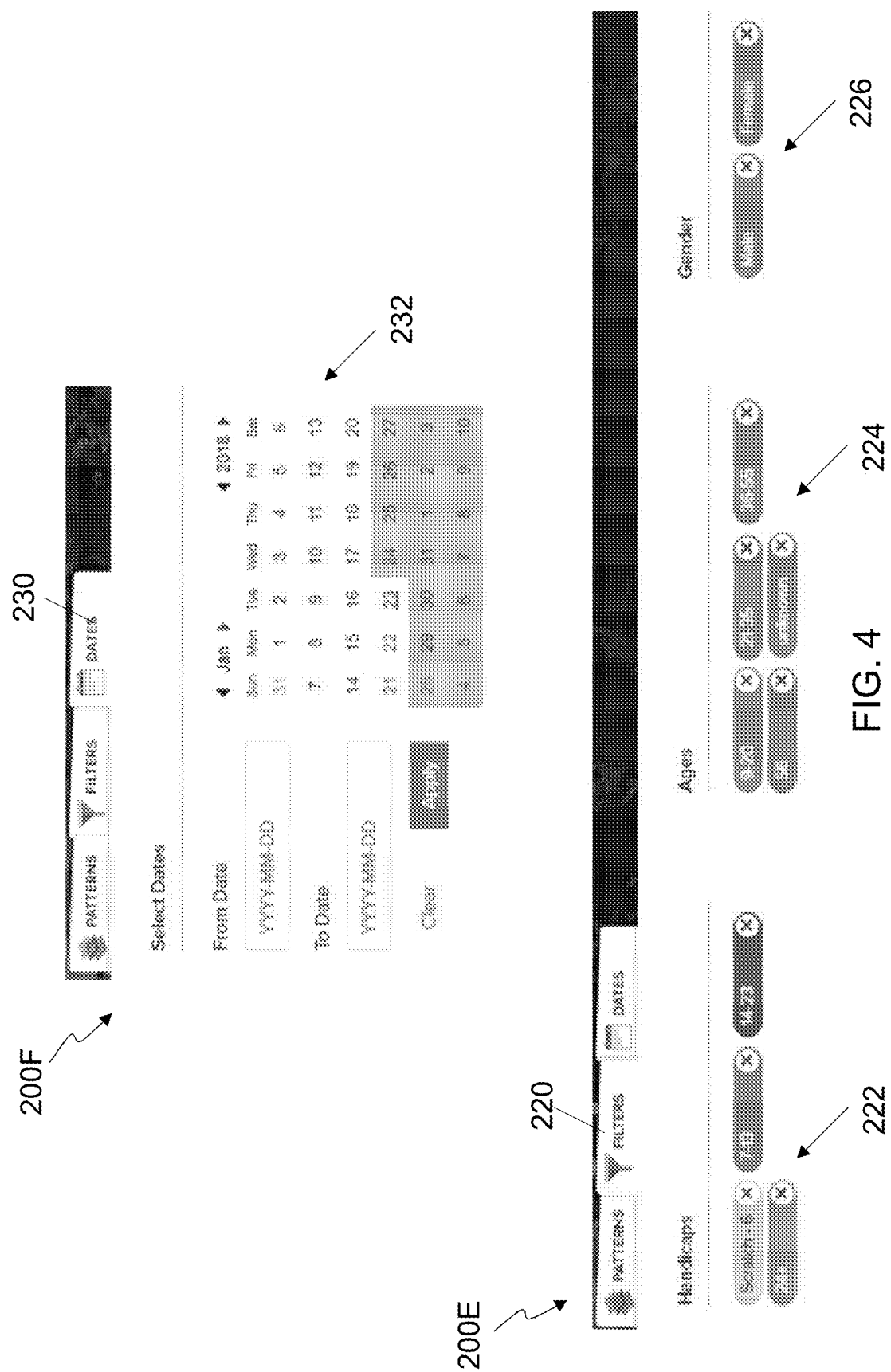
FIG. 4 shows embodiments of GUIs to filter the information for display.

The second GUI 130 provides multiple tabs as well. In the embodiment shown, the PATTERNS tab allows the user to select how to display the information about the hole and is shown in FIGS. 2 and 3 with their associated description. The FILTERS tab allows various demographic parameters to be used to filter the information before it is displayed and the DATES tab allows information from a specific date range to be selected for display. More detail on the FILTERS tab and DATES tab is shown in FIG. 4 with associated description.

FIG. 2A-D show an embodiment of a GUI 200A-D which allows a user to select information to show about a golf course and FIG. 3A-D show partial screenshots 300A-D of the selected information overlaid on an image of a golf hole in response to the respective selection in the GUI 200A-D. The GUI 200A-D is exposed by selection of the PATTERNS tab in the second GUI 130 in the embodiment shown. The GUI 200A-D of the embodiment has four different selections that can be made by a user. While the examples shown are based on a selection of a single hole in the first GUI 120, some embodiments may allow multiple holes to be selected for display together.

Figure 2A:
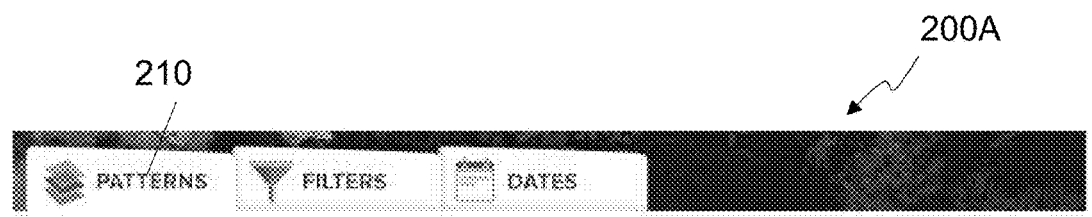
FIG. 2A-D show an embodiment of a graphical user interface (GUI) for selecting information to show about a golf course.

FIG. 2A shows that the user has selected INDIVIDUAL SHOTS 212 under GOLF SHOTS to be shown. FIG. 3A shows a partial screenshot 300A with an image of a golf hole 301 overlaid with a plurality of ball-strike locations (i.e. shots) 322 captured for the selected hole. For the particular partial screenshot 300A, only the second shots (Shot 2) have been selected in the first GUI 120 for display. In some embodiments, the ball-strike locations may be color-coded to indicate certain data related to the shots 322, such as demographic information about the golfer for that shot, the golfer's handicap rating, the club used, time of day of the shot, shot number on that hole, the number of strokes to complete the hole using that shot, or any other information.

Figure 2B:
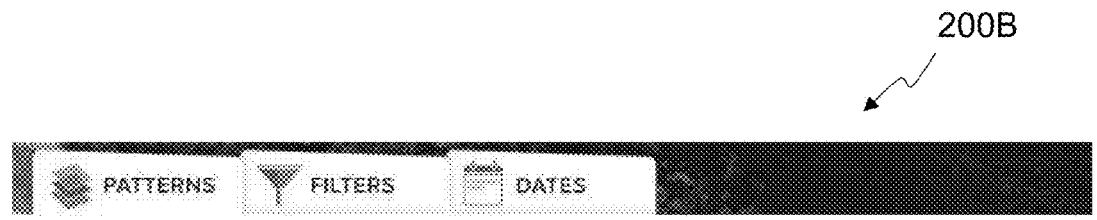

FIG. 2B shows that the user has selected HEATMAP 213 under GOLF SHOTS to be shown. FIG. 3B shows a partial screenshot 300B with an image of a golf hole 301 overlaid with a heatmap of ball-strike locations (i.e. shots) 332 captured for the selected hole. For the particular partial screenshot 300B, only the second shots (Shot 2) have been selected in the first GUI 120 for display. The heatmap 332 uses a color-coding, shading, hash pattern, or other graphical representation to show a shot density for various areas on the hole. In some embodiments, this may be based on a number of shots taken per square yard (or square foot, square meter, or any other areal measure) normalized based on the total number of shots being represented. The calculation may be made by dividing the hole into a grid and calculating the shot density for each area of the grid based solely on the shots taken from that grid area. In other embodiments the calculation may be made by using a convolution filter to select a contribution to the shot density for a given grid area from each of several surrounding areas around that grid area. In at least one embodiment, the convolution filter approximates a sin(x)/x function where x is the distance of a grid point from the selected grid point. In another embodiment, the convolution filter approximates a Gaussian function. Any method may be used to calculate the shot density for the heatmap, depending on the embodiment.

Figure 2C:
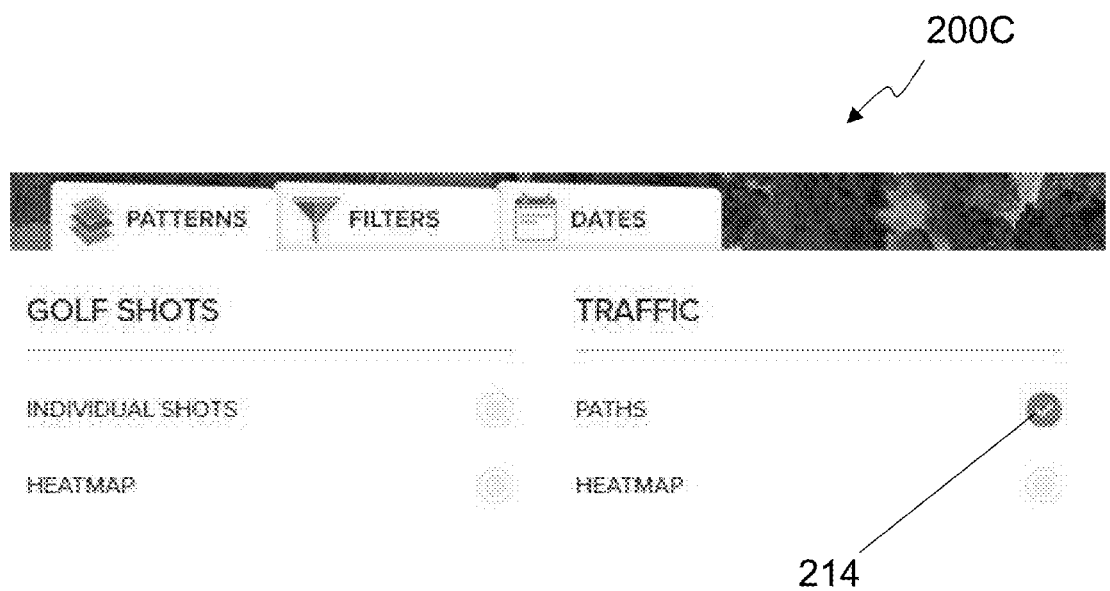

FIG. 2C shows that the user has selected PATHS 214 under TRAFFIC to be shown. FIG. 3C shows a partial screenshot 300C with an image of a golf hole 301 overlaid with a plurality golfer paths 342 captured for the selected hole. A golfer path can be determined using locations captured periodically for a particular golfer, such as the golfer's position captured at a 1 Hz rate. In some embodiments, the golfer paths may be color-coded to indicate certain data related to the paths 342, such as demographic information about the golfer associated with that path, the golfer's handicap rating, time of day of the path, the number of strokes to complete the hole by the golfer using that path, or any other information. While the partial screenshot 300C shows a single hole, if multiple holes are selected, the paths between those holes may also be shown.

Figure 2D:
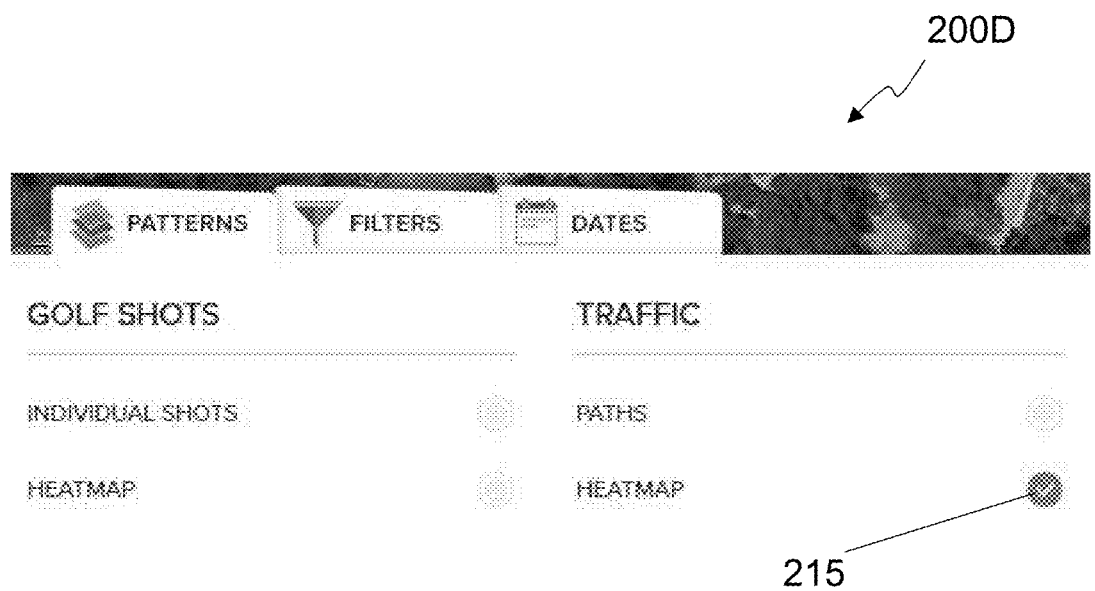

FIG. 2D shows that the user has selected HEATMAP 215 under TRAFFIC to be shown. FIG. 3D shows a partial screenshot 300D with an image of a golf hole 302 overlaid with a heatmap 352 of golfer presence information (e.g. the golfer locations captured on a periodic basis) captured for the selected hole. Golfer presence information is different than path information in that if a golfer is stationary for a period of time, such as 1 minute, only one point is contributed to the path of that golfer, but each capture is used in calculating the heatmap, such as sixty captures (1 per second) of the stationary golfer during the one minute period. The heatmap 352 uses a color-coding, shading, hash pattern, or other graphical representation to show a density of golfer presence for various areas on the hole. In some embodiments, this may be based on a number of location captures per square yard (or square foot, square meter, or any other areal measure) normalized based on the total number of location captures being represented. The calculation may be made by dividing the hole into a grid and calculating the capture density for each area of the grid based solely on the location captures within that grid area. In other embodiments the calculation may be made by using a convolution filter to select a contribution to the capture density for a given grid area from each of several surrounding areas around that grid area. In at least one embodiment, the convolution filter approximates a sin(x)/x function where x is the distance of a grid point from the selected grid point. In another embodiment, the convolution filter approximates a Gaussian function. Any method may be used to calculate the capture density for the heatmap, depending on the embodiment. While the partial screenshot 300D shows a single hole, if multiple holes are selected, the location captures between those holes may also be represented by the heatmap.

FIG. 4 shows embodiments of GUIs to filter the information for display. Partial screenshot 200E shows the second GUI 130 with the FILTERS tab 220 selected and partial screenshot 200F shows the second GUI 130 with the selected DATES tab 230 selected. Both tabs provide the user with the ability to filter the information shown overlaid on the image of the golf hole and/or displayed in the first GUI 120. If the FILTERS tab 220 is selected, various demographic information about the golfer can be selected/deselected to include/exclude their shots in further analysis. The demographic information used to filter the shot information can include handicap 222, age 224, and gender 226. Other embodiments may offer different or additional filtering capability, such as member/nonmember, average driver distance, or other parameters and may or may not include the three demographic parameters shown. The DATES tab 230 brings up a calendar 232 which can be used to select a range of dates to use for further analysis. In embodiments, other tabs may be included in the second GUI 130 for additional filtering or selection of data for analysis and the tabs may work in combination in various embodiments.

FIG. 5A-D show various partial screenshots 500A-D of the second GUI 120 with the STATS tab 123 selected. The embodiment of the second GUI 120 shows four different sections in response to the selection of the STATS tab 123, a score section 510 that shows the average score on the hole compared to par, a time section 520 that shows the average time for golfers to play the hole, a tee shot section 530, and an approach shot section 540, each of which can be expanded if selected to provide more detailed information. Other embodiments may provide different or additional sections providing other statistical information about the hole, and may not include all four sections 510, 520, 530, 540 described herein.

Figure 5A:
FIG. 5A shows an embodiment of a GUI providing more detailed information about scoring on a golf hole.

FIG. 5A shows a partial screenshot 500A where the score section 510 has been expanded 511 to provide more detailed scoring information for the selected golf hole. The score section 511 shows a histogram 515 of scoring broken down by player handicap. Other embodiments may provide additional or different scoring information in the expanded score section 511.

Figure 5B:
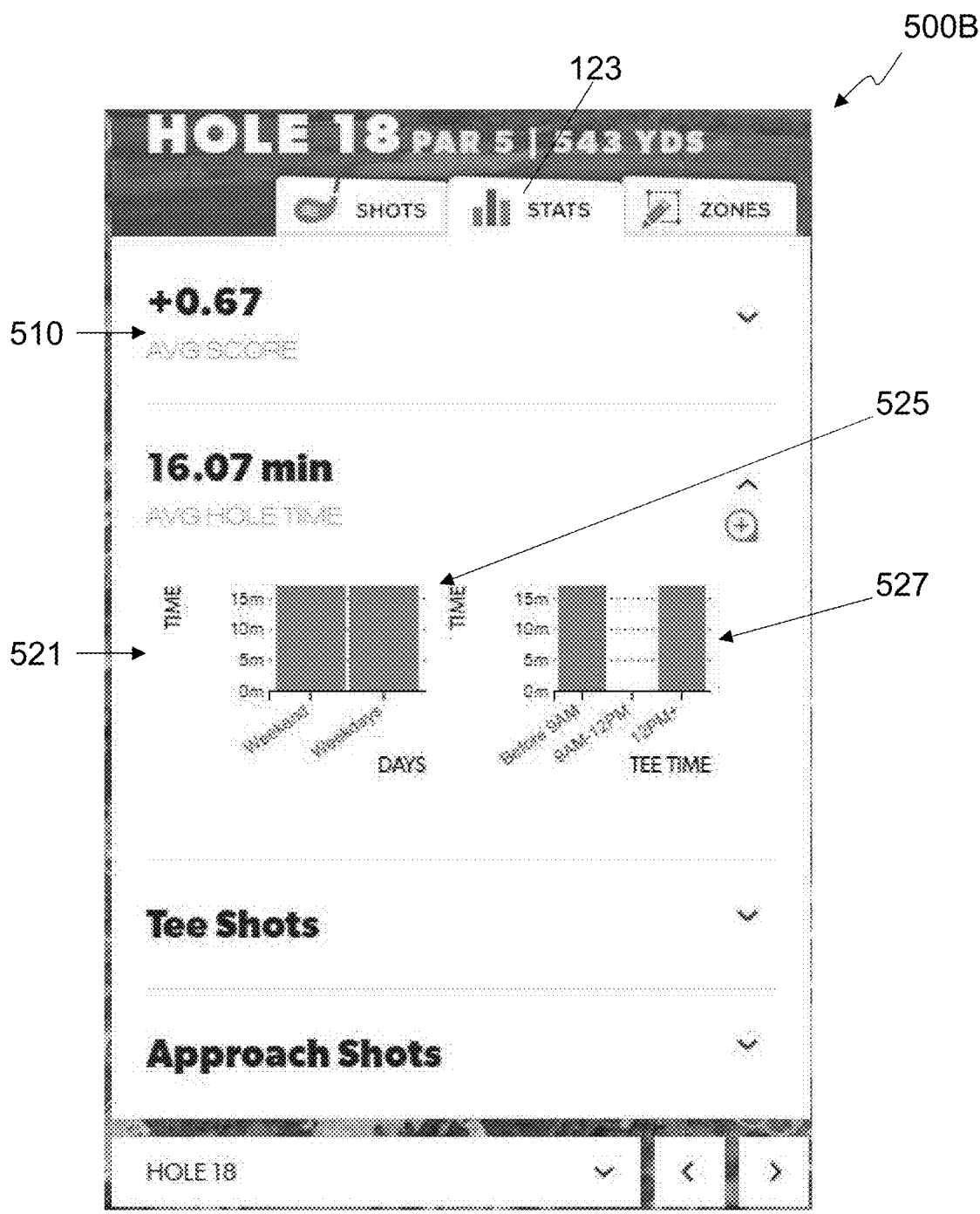
FIG. 5B shows an embodiment of a GUI providing more detailed information about pace of play on a golf hole.

FIG. 5B shows a partial screenshot 500B where the time section 520 has been expanded 521 to provide more detailed time-of-play information for the selected golf hole. The time section 521 shows two histograms, a first histogram 525 breaking down time-of-play for the hole broken down by the portion of the week that the hole was played, and a second histogram 527 breaking down time-of-play for the hole broken down by the time of day that the hole was played. Other embodiments may provide different time-of-play information in the expanded time section 521, such as histograms breaking down time-of-play by handicap, gender, or other demographic information, or statistical distributions of time-of-play.

Figure 5C:
FIG. 5C shows an embodiment of a GUI providing more detailed information about tee shots on a golf hole.

FIG. 5C shows a partial screenshot 500C where the tee shot section 530 has been expanded 531 to provide information about tee shots hit on the selected golf hole. In the embodiment shown, the expanded tee shot section 531 provides a graphical representation of tee shot accuracy 535. One block is shown for the percentage of fairways hit. The remaining percentage is then divided into two blocks showing the percentage of the misses that are to the left, and the percentage of the misses that are to the right. Other embodiments may provide different tee shot information such as distance distribution, and/or breakdowns of tee shot information based on demographic or other information.

Figure 5D:
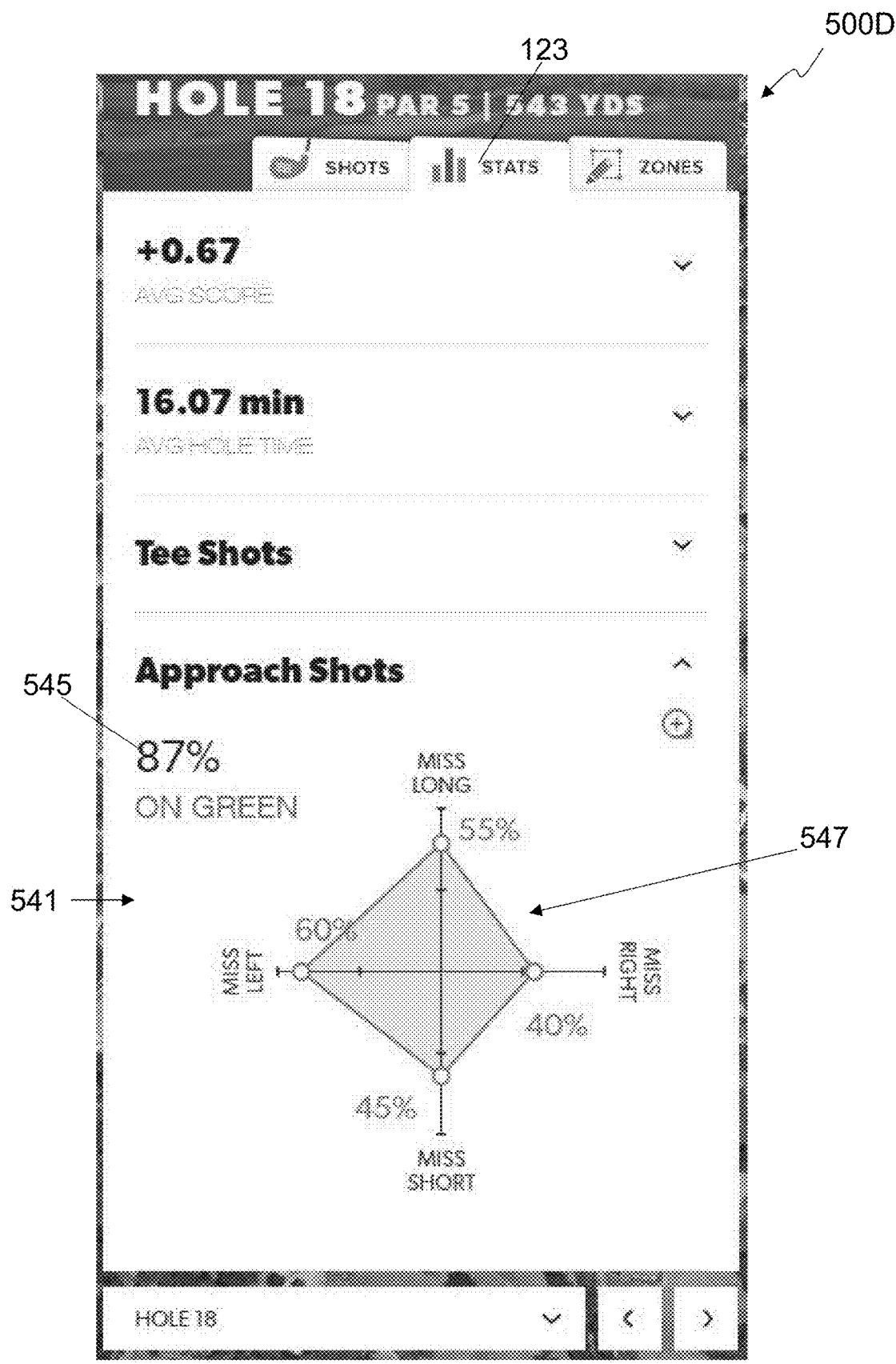
FIG. 5D shows an embodiment of a GUI providing more detailed information about approach shots on a golf hole.

FIG. 5D shows a partial screenshot 500D where the approach shot section 540 has been expanded 541 to provide information about approach shots on the selected golf hole. Which shot is an approach shot may be determined in many different ways, but in at least one embodiment, a shot that starts more than 30 yards from the green and comes to rest on or within 30 yards of the green is classified as an approach shot. In the embodiment shown, the expanded approach shot section 541 provides the percentage of the approach shots that stay on the green 545 as well as a graphical representation of tee shot accuracy 547. The graphical representation 547 may be referred to as a spidograph. Each approach shot that misses the green is analyzed to determine whether it is long or short and whether it is left or right of the pin placement of the center of the green (depending on whether the pin placement is known). The information about the approach shots that missed the green is then compiled into the spidograph 547. Other embodiments may provide different approach shot information such as approach shot length distribution, and/or breakdowns of approach shot information based on demographic or other information.

Figure 6:
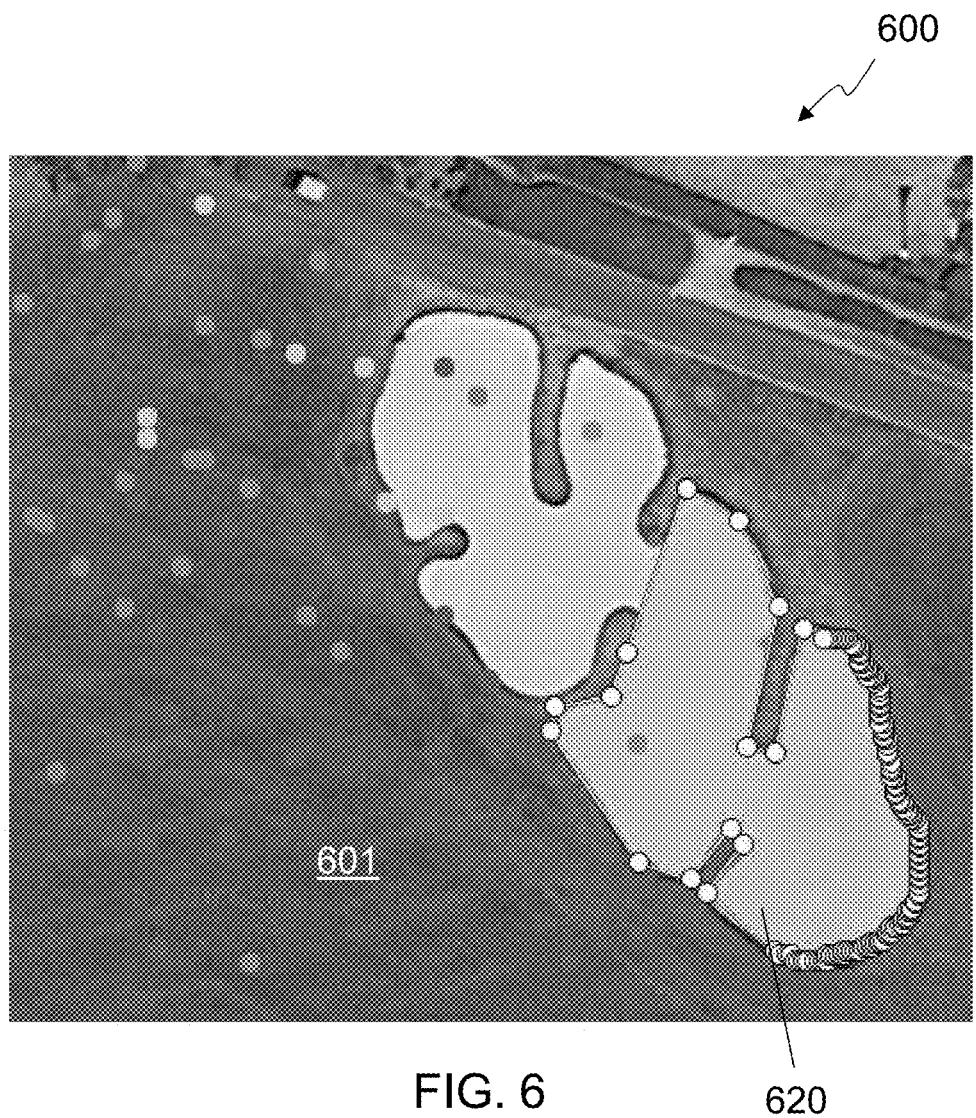
FIG. 6 shows the area of a proposed change overlaid on an image of a golf hole in an embodiment.
Figure 7:
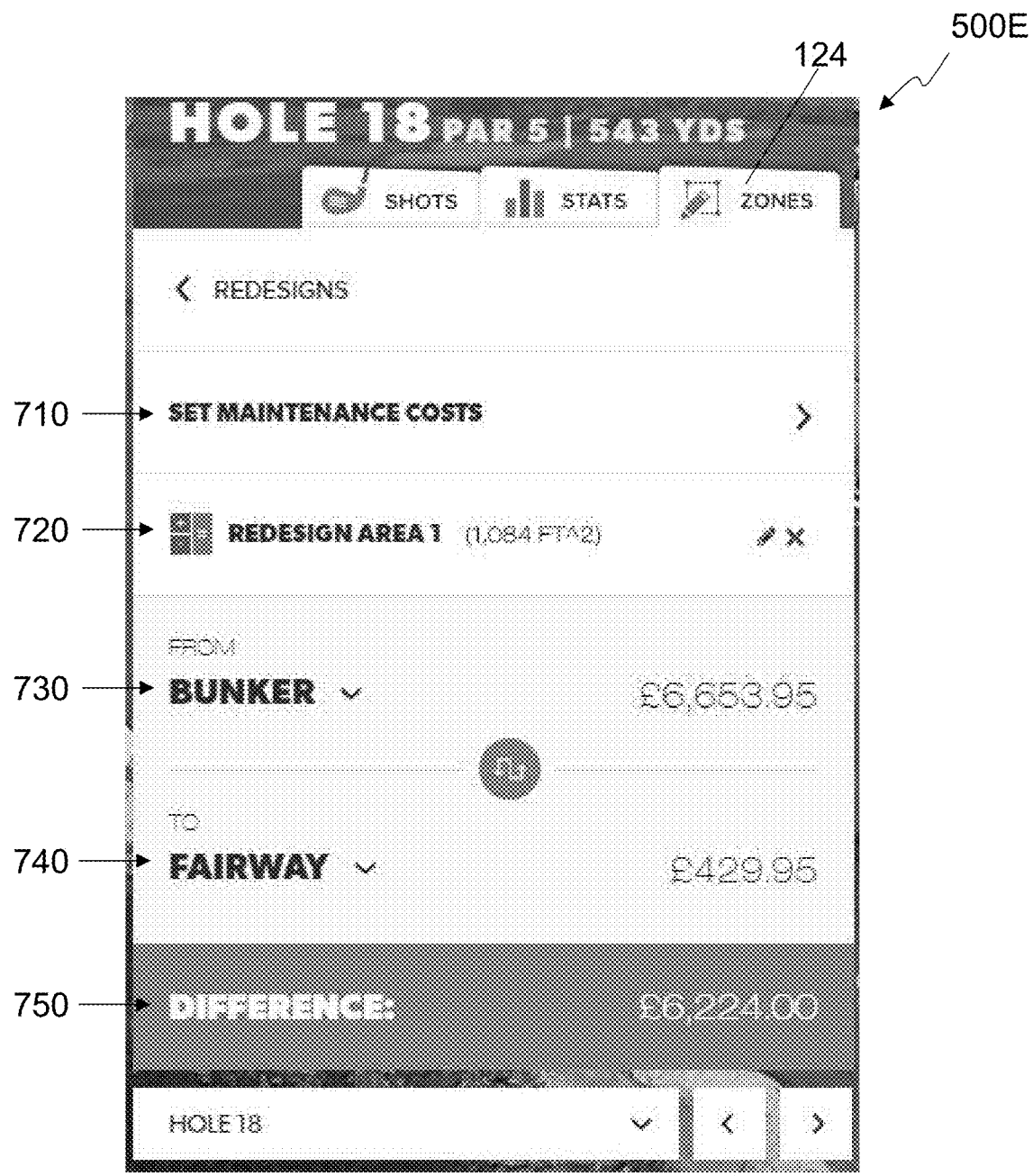
FIG. 7 shows an embodiment of a GUI providing information about the proposed change to an area of the golf course.

If the ZONES tab 124 of the first GUI 120 is selected, two options are provided to the user in at least some embodiments. The user can either select REDESIGNS or STAT AREAS. FIGS. 6 and 7 show the functionality of the first GUI 120 if REDESIGNS is selected and FIGS. 8A/B and 9 A/B show the functionality of the first GUI 120 if STAT AREAS is selected.

If REDSIGNS is selected the user is provided with the ability to plan various changes to the golf course. After REDESIGNS has been selected the user is presented with the ability to add a redesign area and a list of previously designated redesigns. If ADD REDESIGN is selected, the user is instructed to "Click the map to start drawing a zone" to designate a redesign area.

FIG. 6 is a partial screenshot 600 showing the area of the proposed redesign area 620 overlaid on an image of a golf hole 601 in an embodiment. The area 620 in this case is REDESIGN AREA 1. The user can click to points to create a corner of the selected area or can hold down the SHIFT key and left mouse button to create a series of corners of the selected area. In many cases the user may follow boundaries of a feature of the golf hole 601 such as the edges of the bunker in proposed redesign area 620. In this case it can be seen that very few golfers end up in parts of the bunker and it may be possible to save money on maintenance without impacting the quality of play.

FIG. 7 shows partial screenshot 500E of the first GUI 120 with the ZONES tab 124 selected, REDESIGNS is selected, and then REDESIGN AREA 1 is selected. The partial screenshot 500E shows several different areas within the GUI, including a SET MAINTENANCE COSTS area 710, a REDESIGN AREA 1 area 720, a FROM area 730, a TO area 740 and a DIFFERENCE area 750.

If the user selects the SET MAINTENANCE COSTS area 710, they are presented with a page to enter costs of maintenance for various types of features of the golf course, such as fairways, greens, rough, tees, and bunkers, although other embodiments may include other features, such as water or cartpath, and may or may not include all of the features mentioned. In some embodiments, the user can create their own custom feature with a custom name and its own maintenance costs. The maintenance costs can include any type of cost associated with the feature, including, but not limited to, mowing, application of fertilizer, herbicide, and/or pesticide, annualized reconstruction, irrigation, and aeration.

The user can select the FROM area 730 to identify the current type of the feature, such as the bunker of are 620, and the TO area 740 to select a proposed change of the feature type, such as changing the bunker to fairway. Once that information is entered, the system can use the calculated area of REDSIGN AREA 1 along with the maintenance costs entered into the SET MAINTENANCE COST area 710 to calculate the difference in maintenance cost if the change were to be made which is shown in the DIFFERENCE area 750.

If STAT AREAS is selected after the ZONES tab 124 is first selected, the user is provided with the ability to analyze play on the course based on rounds which hit a ball into a selected area of the course. After STAT AREAS has been selected the user is presented with the ability to add a stat area and a list of previously designated stat areas, such as shown the partial screen shot 500F of FIG. 9A, which includes an area 910 to select STAT AREA 1, and an area 960 to select STAT AREA 2 as well as an area 905 to select to ADD STAT AREA. If ADD STAT AREA 905 is selected, the user is instructed to "Click the map to start drawing a zone" to designate a stat area.

Figure 8A:
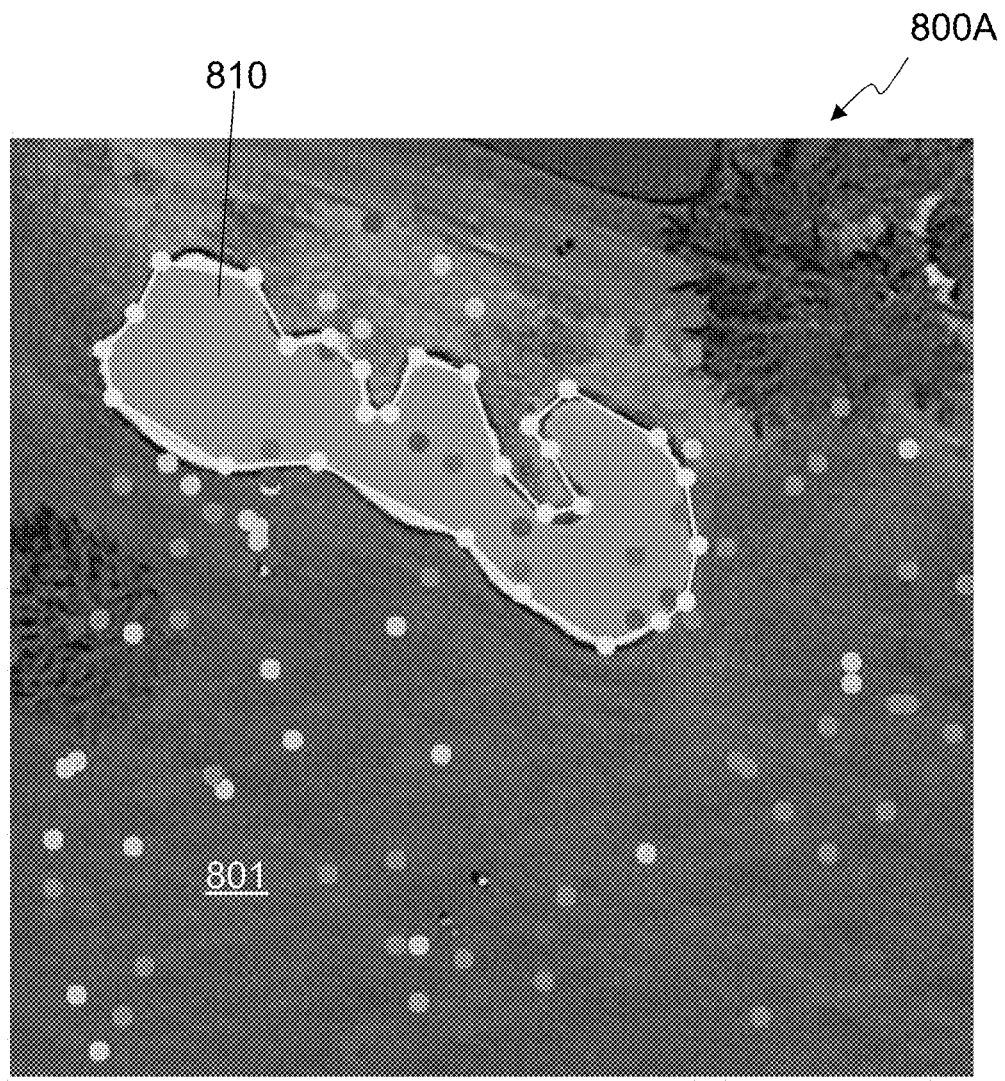
FIG. 8A/B show selected information overlaid on an image of a golf hole in embodiments.
Figure 8B:
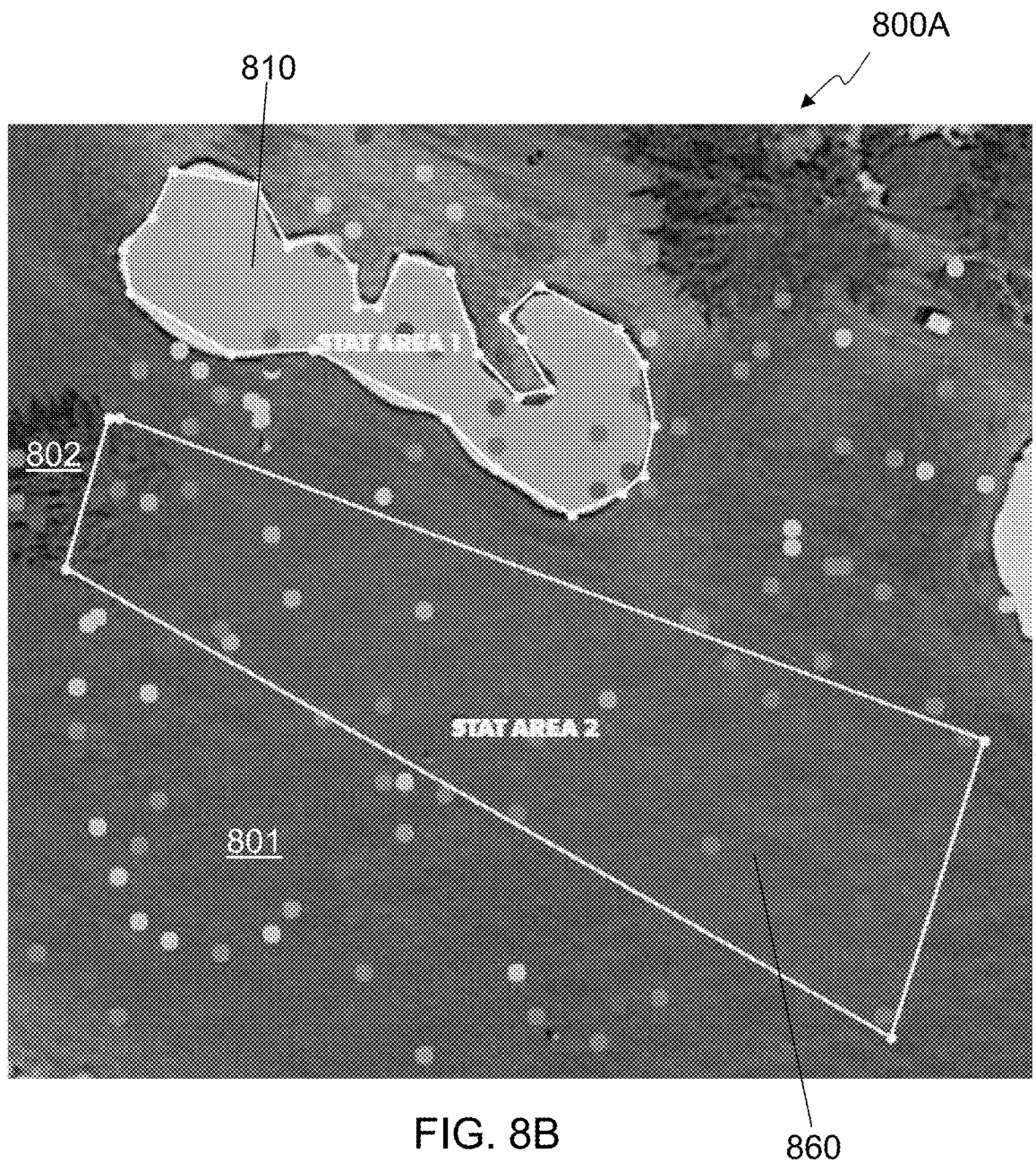

FIG. 8A is a partial screenshot 800A showing the first stat area 810 overlaid on an image of a golf hole 801 in an embodiment. The area 810 in this case is STAT AREA 1. The user can click to points to create a corner of the selected area or can hold down the SHIFT key and left mouse button to create a series of corners of the selected area. FIG. 8B is a partial screenshot 800B showing two different stat areas which have been created, STAT AREA 1 810, and STAT AREA 2 860 overlaid on an image of a golf hole 801. There many different cases where it could be useful to understand how golfers that land their ball in a particular area play the hole. For example, STAT AREA 1 810 follows the outline of a bunker. It can be helpful to understand what impact this has on their scoring and/or pace-of-play. STAT AREA 2 860 shows golfers whose second shot may be impacted by the tree 802. It could be useful to understand the impact that the tree 802 has on the playability of the hole. Stat areas can be combined with the filtering offered by the second GUI 130 to better understand what impact different course features have on different types of players.

Figure 9A:
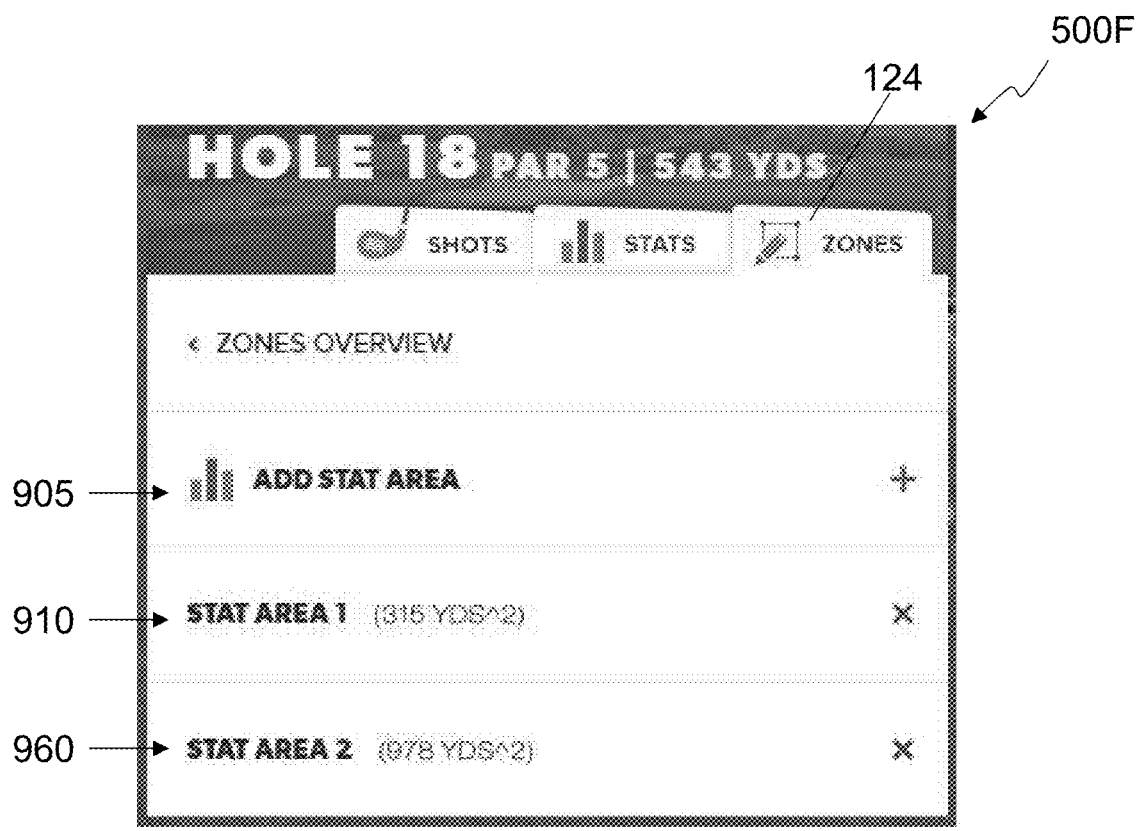
FIG. 9A/B show an embodiment of a graphical user interface (GUI) for selecting golf rounds to analyze.
Figure 9B:

FIG. 9B shows a partial screenshot 500G which is shown if STAT AREA 1 910 is selected in the partial screenshot 500F of FIG. 9A. The partial screenshot 500G shows a GUI functionality of the first GUI 120 which analyzes the play of the selected hole only for times where the ball was struck from with the selected stat area. So in the example shown, the ball strikes shown within STAT AREA 1 810, are used to find what score was made with that ball strike for the selected hole and how much time it took to play the hole with that ball strike. The average score for those rounds, which may also be limited by the filtering offered by the second GUI 130, is shown as an average score 920 compared to par and various statistics may also be presented such as the histogram 930. The average time to play the hole using the selected shots is also shown in the time area 940 and if the time area 940 is selected, additional statistics may be presented regarding pace-of-play. The approach shot area 950 may be selected to show a spidograph of approach shots from the selected plays of the hole. Other embodiments may provide different information.

Figure 10:
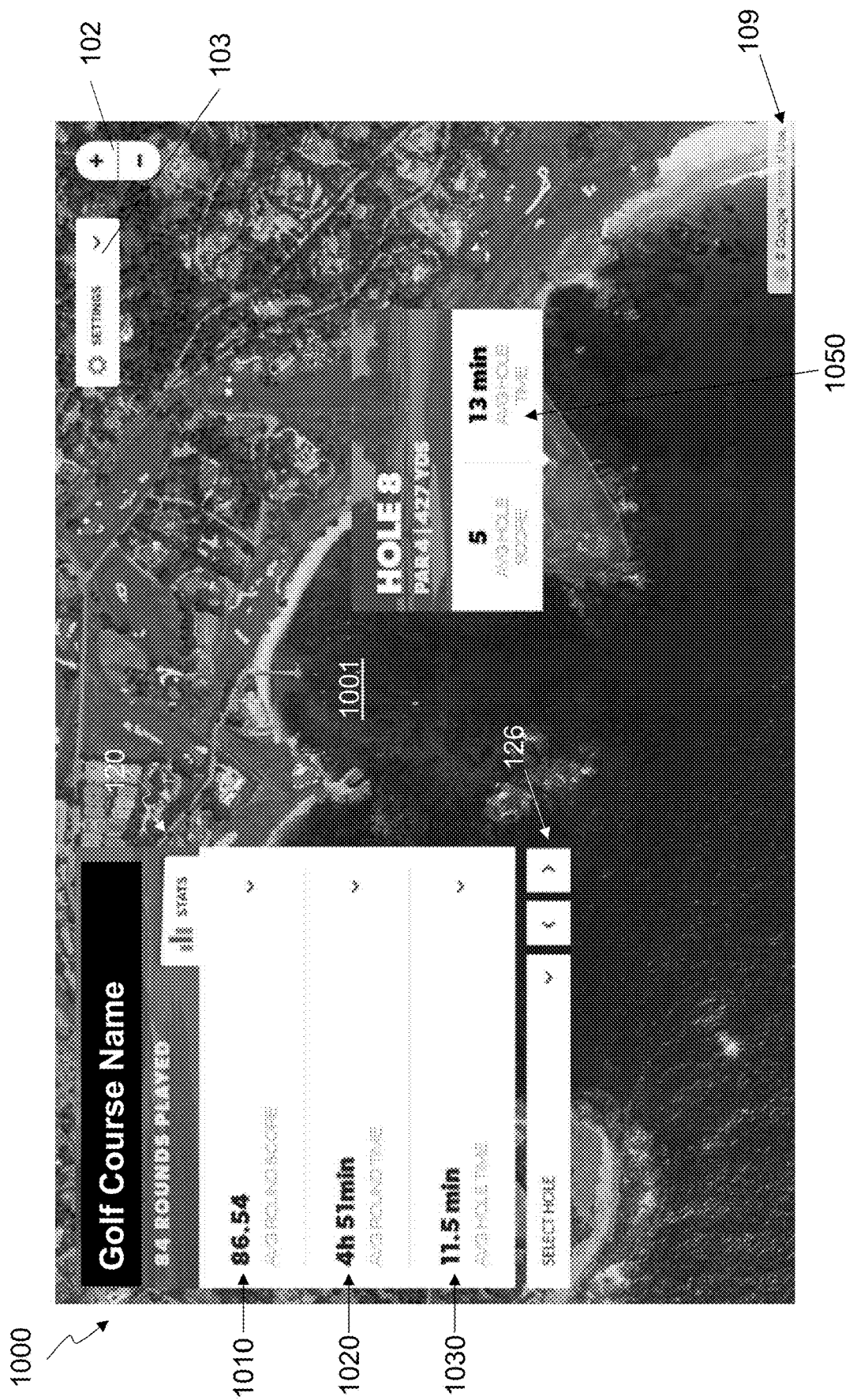
FIG. 10 is a screenshot of an embodiment of a golf course management tool relating to the entire course.

FIG. 10 is a screenshot 1000 of an embodiment of a golf course management tool. The screenshot 1000 relates to the entire golf course. The screenshot 1000 includes an aerial image 1001 of the at least a portion of the golf course. The screenshot 1000 also includes one or more graphic user interface (GUI) elements, such as zoom controls 102, a settings GUI 103, and a first GUI 120. The screenshot also includes a copyright notice 109 in this embodiment.

The first GUI 120 of this embodiment includes the name of the golf course and a hole selection area 126 that allows a different hole to be selected. If a hole is selected using the hole selection area 126, the tool will change to a screen similar to that shown in FIG. 1 and analyze only a single hole. The first GUI 120 includes a score area 1010, a round time area 1020, and a hole time area 1030 which are shown in more detail in FIG. 11A-C. In some embodiments, if the user moves the cursor over a particular golf hole in the image 1001, a pop-up GUI element 1050 may be presented to the user with information about that particular hole.

Figure 11A:
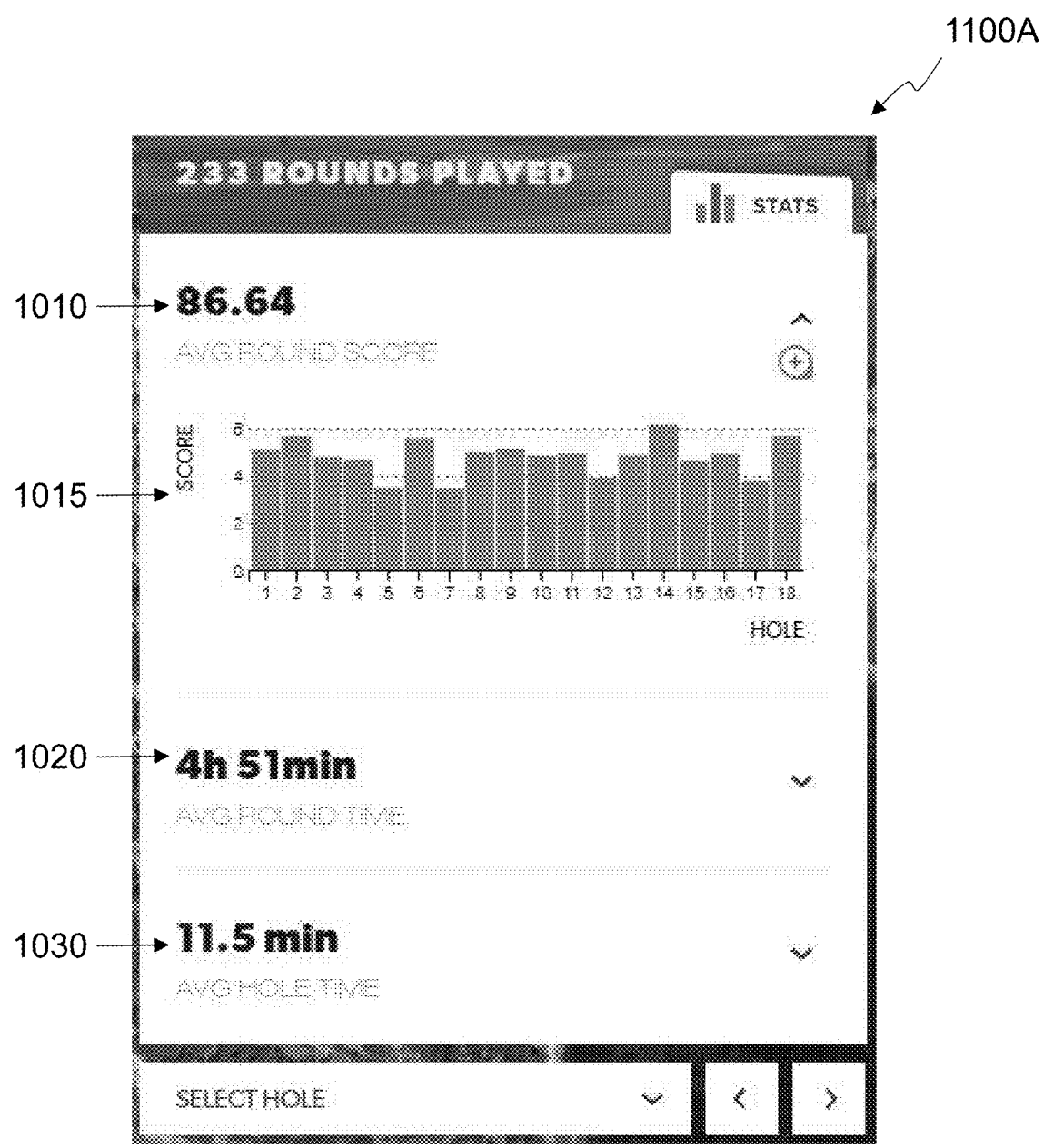
FIG. 11A shows an embodiment of a GUI providing more detailed information about scoring on a golf course.

FIG. 11A shows a partial screenshot 1100A of an embodiment of a GUI providing more detailed information about scoring on a golf course. A score area 1010, which shows the average score per round for the course for the rounds where ball-striking location information has been collected. The score area 1010 has been selected so a bar chart 1015 showing the average score per hole is presented. A round time area 1020 and hole time area 1030 area also presented to the user.

Figure 11B:
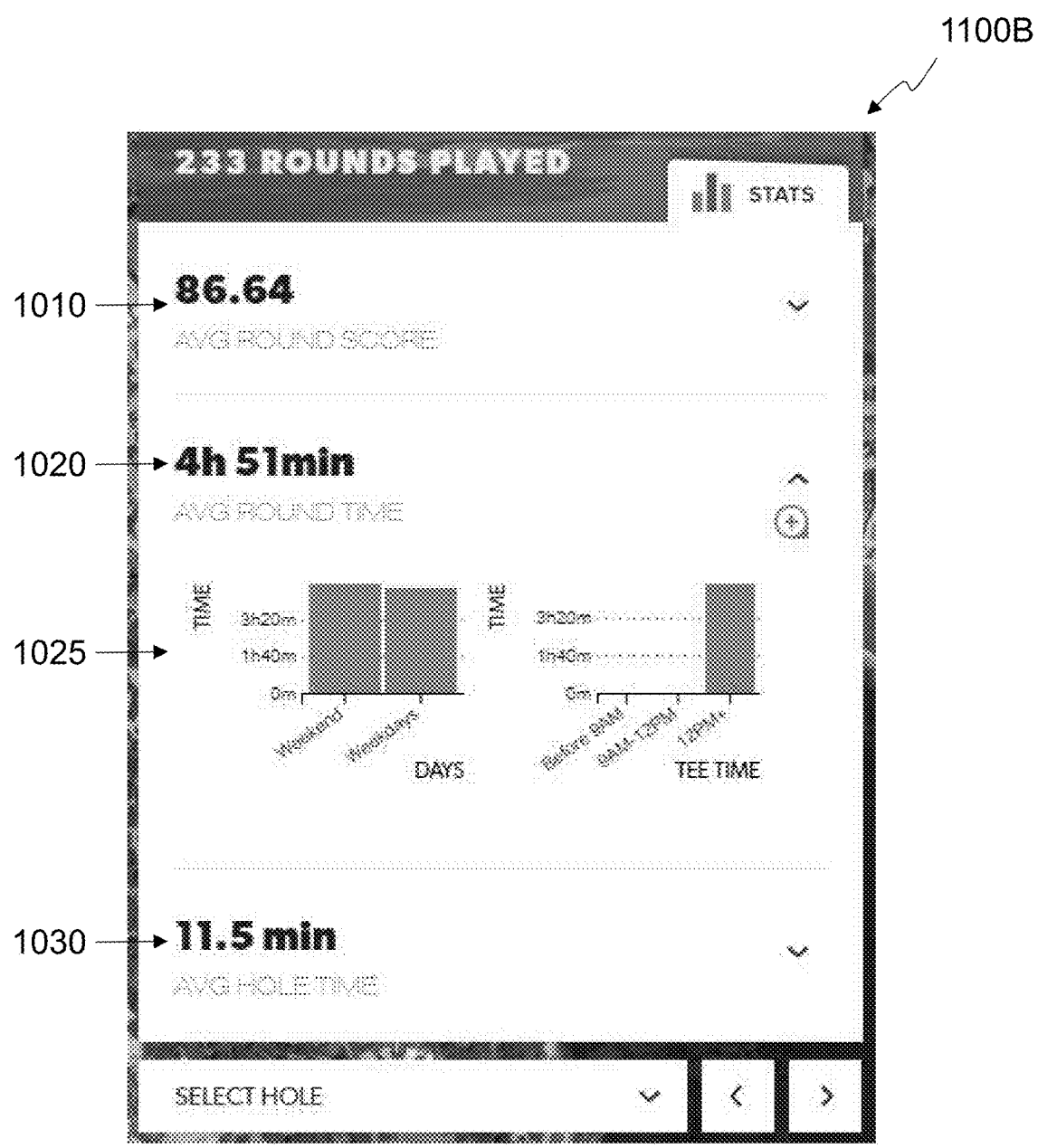
FIG. 11B/C show an embodiment of a GUI providing more detailed information about pace of play on a golf course.

FIG. 11B shows a partial screenshot 1100B of an embodiment of a GUI providing more detailed information about pace-of-play on a golf course. A round time area 1020 shows the average time per round for the course for the rounds where ball-striking location information has been collected. The round time area 1020 has been selected so bar charts 1025 showing the round time broken down by time of week and time of day is presented. A score area 1010 and hole time area 1030 area also presented to the user.

Figure 11C:
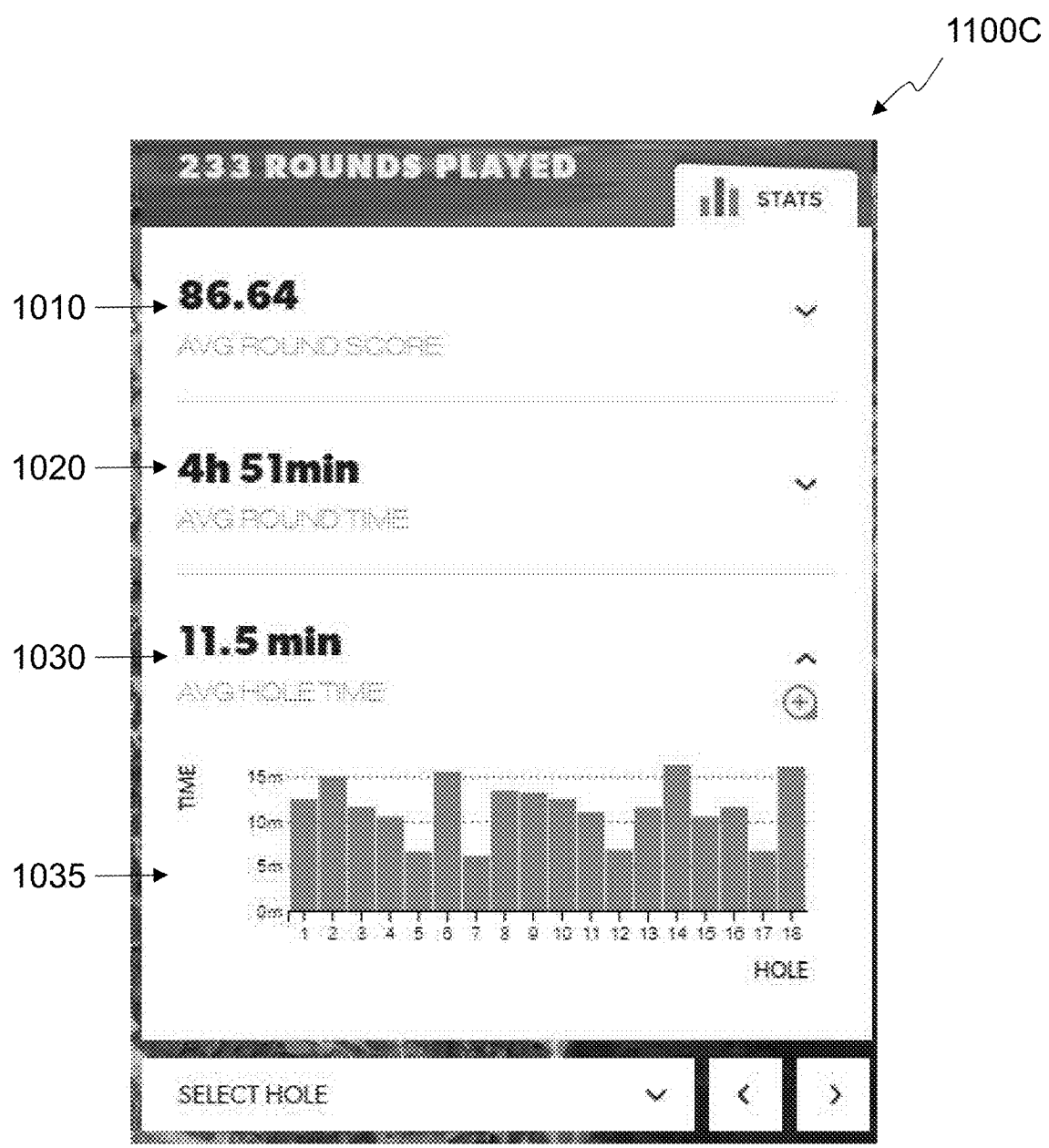

FIG. 11C shows a partial screenshot 1100C of an embodiment of a GUI providing more detailed information about pace-of-play on a golf course. A hole time area 1030 shows the average time per hole for the course for the rounds where ball-striking location information has been collected. The hole time area 1030 has been selected so a bar chart 1035 showing the playing time for each hole is presented. A score area 1010 and round time area 1020 area also presented to the user.

Figure 12:
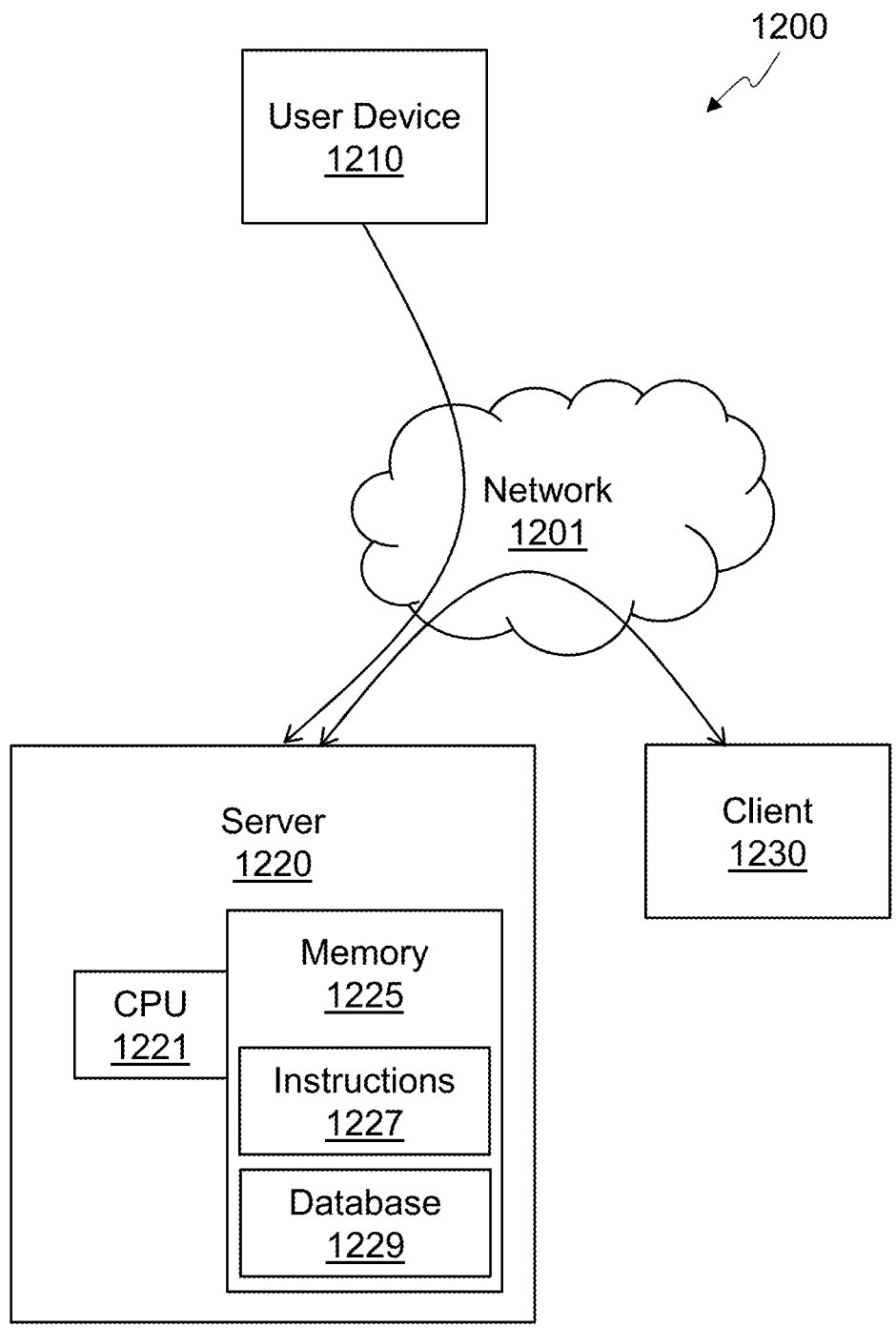
FIG. 12 shows a block diagram of an embodiment of a system for managing a golf course.

FIG. 12 shows a block diagram of an embodiment of a system 1200 for managing a golf course. The system includes a user device 1210 to track a golfer's location during a round of golf. In some embodiments, the user device 1210 may periodically determine the golfer's location. In some embodiments, the user device may determine a location of a ball strike by the golfer. The user device may be a dedicated device, may be a smartphone with a software app, or may be a combination of the two.

The user device communicates with a server 1220 over a network 1201. The network 1201 may include the internet and may include multiple different computer and/or telecommunications networks linked together. Any type of hardware and/or software communication link/protocol may be used alone or in combination for the communication between the user device 1210 and the server 1220, but in at least one embodiment, 4G or 5G telecommunications networks such as long-term evolution (LTE) and an internet protocol (IP) are used, at least in part, for the communication.

The server 1220 includes a processor (i.e. CPU) 1221 coupled to memory 1225. Any suitable processor 1221 and memory 1225 may be used, but in at least some embodiments, the memory includes both random access memory (RAM) and non-volatile memory such as disk drives. The memory 1225 stores instructions 1227 that can be executed by the processor 1221 to perform tasks as described herein. The memory 1225 also includes a database for storing the location information received from the user device 1210. The server 1220 may be remote and accessible to the user device and client 1230 only through the network 1201 and may in some cases be referred to as a cloud server. The server 1220 may provide web hosting services to serve hypertext markup language (HTML) pages to a client device, such as client 1230, using a hypertext transfer protocol (HTTP).

The client 1230 can be any sort of computer device that can communicate with the server 1220 over the network 1201. The client 1230 may execute a browser program to retrieve the HTML pages from the server 1220 and render them for a user. The HTML pages can provide a user interface and may include any of the images shown in FIG. 1-11 as well as other GUIs and information provided by the server 1220 based on the location information received from the user device 1210.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and/or block diagrams in the figures help to illustrate the architecture, functionality, and operation of possible embodiments of systems, devices, methods, and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems or circuitry that perform the specified functions or acts, or combinations of special purpose hardware, circuitry, and computer instructions.

These computer program instructions, such as those used to implement any method described herein, may also be stored in a non-transitory computer-readable medium, such as a tangible computer memory, or tangible memory, that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 13:
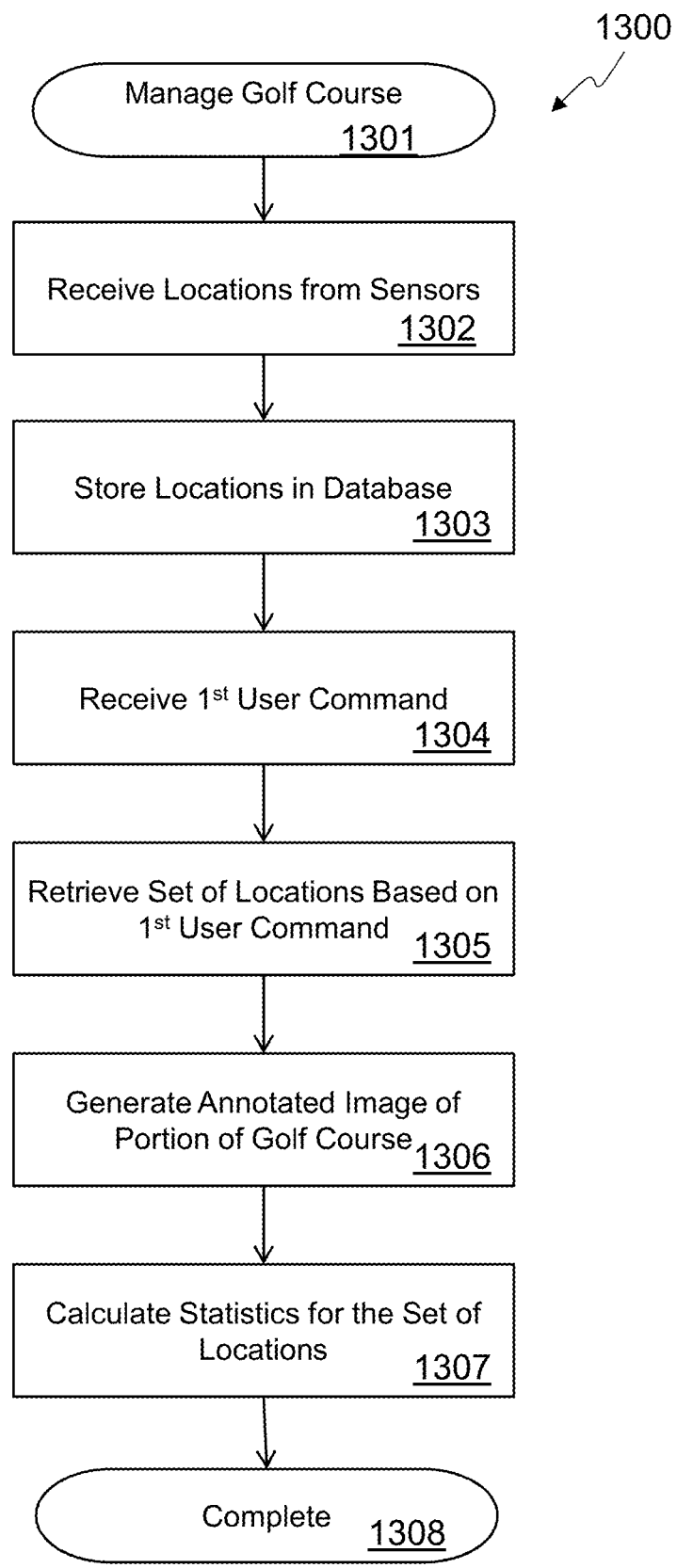
FIG. 13 shows a flow chart of an embodiment of a method of managing a golf course.

FIG. 13 shows a flow chart 1300 of an embodiment of a method of managing a golf course. The method of managing a golf course starts at block 1301 and includes receiving, at block 1302, a plurality of locations respectively corresponding to a plurality of ball strikes on a golf course. The plurality of locations are determined by sensors associated with individual players during a plurality of rounds of play on the golf course. The plurality of locations are stored in a database at block 1303. The plurality of locations are linked to the golf course in the database. At block 1304, a first user command is received over a network identifying a portion of the golf course. An overhead image of the identified portion of the golf course is obtained. A set of one or more locations of the plurality of locations is retrieved from the database at block 1305. The set of one or more locations correspond to the identified portion of the golf course. A set of graphical identifiers are added to the overhead image at block 1306 to generate an annotated image. The graphical identifiers correspond to the set of one or more locations. The image with graphical identifiers is presented to a user over the network. Statistics for a hole of the golf course are calculated at block 1307 based on the set of one or more locations corresponding to the identified portion of the golf course. The flow chart completes at block 1308.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "server," "circuit," "module," "client," "computer," "logic," or "system." Furthermore, aspects of the various embodiments may take the form of a computer program product embodied in one or more computer-readable medium(s) having computer program code stored thereon.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be the to be non-transitory. A computer data transmission medium, such as a transmission line, a coaxial cable, a radio-frequency carrier, and the like, may also be the to store data, although any data storage in a data transmission medium can be the to be transitory. Nonetheless, a computer-readable storage medium, as the term is used herein, does not include a computer data transmission medium.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Examples of various embodiments are described below:

Embodiment 1

A method of managing a golf course, the method comprising: receiving a plurality of locations respectively corresponding to a plurality of ball strikes on a golf course, the plurality of locations determined by sensors associated with individual players during a plurality of rounds of play on the golf course; storing the plurality of locations in a database, the plurality of locations linked to the golf course in the database; receiving a first user command identifying a portion of the golf course over a network and obtaining an overhead image of the identified portion of the golf course; retrieving a set of one or more locations of the plurality of locations from the database, the set of one or more locations corresponding to the identified portion of the golf course; adding a set of graphical identifiers that correspond to the set of one or more locations to the overhead image and presenting the image with graphical identifiers to a user over the network; calculating statistics for a hole of the golf course based on the set of one or more locations corresponding to the identified portion of the golf course.

Embodiment 2

The method of claim 1, wherein the portion of the golf course is a hole of the golf course.

Embodiment 3

The method of claim 1, further comprising: receiving a second user command which includes identification of three or more points on the overhead image to define a selected area on the golf course; and limiting the set of one or more locations to those locations within the selected area.

As used in this specification and the appended claims, the singular forms "a", "an", and "the" include plural referents unless the content clearly dictates otherwise. Thus, for example, reference to an element described as "a processor" may refer to a single processor, two processors, or any other number of processors but a reference to "a single processor" refers to only one processor. As used in this specification and the appended claims, the term "or" is generally employed in its sense including both a union operator (OR) and an intersection operator (AND), which may also be referred to as an "inclusive OR" or an "and/or" unless the content clearly dictates otherwise. As used in this specification and the appended claims, the term "coupled" includes direct and indirect connections. Moreover, where first and second devices are coupled, intervening devices, including active devices, may be located there between. As used in this specification and the appended claims, the phrase "based on" should be interpreted as being open ended, equivalent to "based, at least in part, on" and allow for the action to be based on other elements in addition to the elements specified. Unless otherwise indicated, all numbers expressing quantities of elements, percentages, and so forth used in the specification and claims are to be understood as being modified in all instances by the term "about." Interpretation of the term "about" is context specific, but in the absence of other indications, should generally be interpreted as ±10% of the modified quantity, measurement, or distance. The recitation of numerical ranges by endpoints includes all numbers subsumed within that range (e.g. 1 to 5 includes 1, 2.78, 3.$\overline{33}$, and 5). For the purposes of any filing in the United States of America, any element in a claim that does not explicitly state "means for" performing a specified function, or "step for" performing a specified function, is not to be interpreted as a "means" or "step" clause as specified in 35 U.S.C. § 112(f).

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A method for managing a golf course, the method comprising:
   receiving a plurality of player locations respectively associated with a plurality of rounds of play on a golf course the plurality of player locations determined by sensors associated with individual players during the plurality of rounds of play on the golf course, at least some of the plurality of player locations representing ball-strike locations;
   storing the plurality of player locations linked with their associated round of play in a database;
   receiving a first user command over a network from a client device identifying a first portion of the golf course;
   retrieving a set of one or more ball-strike locations from the plurality of player locations stored in the database, the set of one or more ball-strike locations located within the first portion of the golf course;
   creating a first graphical representation based on the set of one or more ball-strike locations, the first graphical representation comprising a spidograph of approach shots to a green included in the first portion of the golf course, the spidograph providing information about percentages of the approach shots that are long, short, left and right of the green;
   sending the first graphical representation over the network to the client device for presentation to a user;
   receiving a second user command over the network from the client device defining a first selected area within the first portion of the golf course;
   identifying a first set of rounds of play from the plurality of rounds of play on the golf course that are associated with a ball-strike location of the plurality of player locations that is located within the first selected area;
   calculating at least one time-of-play statistic for the first set of rounds of play;
   sending the at least one time-of-play statistic for the first set of rounds of play over the network to the client device for presentation to the user;
   receiving a third user command over the network from the client device identifying a second portion of the golf course;
   obtaining an overhead image of the second portion of the golf course;
   retrieving a collection of one or more player locations from the plurality of player locations stored in the database, the collection of one or more player locations located within the second portion of the golf course;
   creating a second graphical representation based on the collection of one or more locations and the overhead image of the second portion of the golf course;
   sending the second graphical representation over the network to the client device for presentation to the user;
   receiving a fourth user command from the client device over the network, the fourth user command including identification of three or more points on the second graphical representation to define a second selected area on the golf course;
   receiving at least a first maintenance cost for a first feature type and a second maintenance cost for a second feature type of the golf course from the client device over the network;
   identifying a current feature type of the second selected area as the first feature type and a proposed feature type for the second selected area as the second feature type; and
   calculating a maintenance cost difference for the second selected area between the current feature type and the proposed feature type as a function of the first maintenance cost and the second maintenance cost.

2. The method of claim 1, further comprising:
   obtaining an overhead image of the first portion of the golf course; and creating the first graphical representation further based on the overhead image of the first portion of the golf course.

3. The method of claim 1, wherein the at least one time-of-play statistic for the first set of rounds of play comprises an average time-of-play for a hole of the golf course that includes the first selected area.

4. The method of claim 1, further comprising:
receiving a fifth user command which includes identification of a third selected area within the first portion of the golf course;
identifying a second set of rounds of play from the plurality of rounds of play on the golf course that include a second ball-strike location of the plurality of player locations that is located within the third selected area;
calculating the at least one time-of-play statistic for the second set of rounds of play; and
sending the at least one time-of-play statistic for the second set of rounds of play over the network to the client device for presentation to the user to allow the user to compare the at least one time-of-play statistic for the first set of rounds of play to the at least one time-of-play statistic for the second set of rounds of play.

5. The method of claim 1, further comprising filtering the first set of rounds of play on the golf course based on a characteristic of a player before said calculation of the at least one time-of-play statistic.

6. The method of claim 1, further comprising filtering the first set of rounds of play on the golf course based on a characteristic of a round of play on the golf course before said calculation of the at least one time-of-play statistic.

7. The method of claim 1, wherein the at least one time-of-play statistic comprises histogram information for time-of-play for a hole of the golf course that includes the first selected area.

8. The method of claim 7, wherein the histogram information is broken down based on a characteristic of a player, a time of day, a day of a week, or a statistical distribution of time-of-play.

9. The method of claim 1, wherein the plurality of player locations include a set of path locations of the individual players which were captured at regular intervals during the plurality of rounds of play on the golf course
receiving a fifth user command over the network from the client device identifying a third portion of the golf course;
retrieving a set of one or more path locations from the plurality of player locations stored in the database, the set of one or more path locations located in the third portion of the golf course;
creating a third graphical representation based on the set of one or more path locations;
sending the third graphical representation over the network to the client device for presentation to the user.

10. The method of claim 9, further comprising:
generating a plurality of paths based on the set of one or more path locations, the plurality of paths respectively corresponding to portions of paths of the individual players during individual rounds of play of the plurality of rounds of play on the golf course; and
creating the third graphical representation based on the plurality of paths.

11. The method of claim 10, further comprising:
obtaining an overhead image of the third portion of the golf course; and
rendering an image of the plurality of paths overlaid on the overhead image of the third portion of the golf course as the third graphical representation.

12. The method of claim 10, further comprising:
color-coding the plurality of paths in the third graphical representation based on information about the individual players or the individual rounds of play.

13. The method of claim 9, further comprising:
generating a heatmap based on the plurality of path locations, the heatmap representing presence information of the individual players during the plurality of rounds of play on the golf course, the presence information calculated using weighting factors based on periods of time that the individual players were respectively at the plurality of locations; and
creating the third graphical representation based on the heatmap.

14. The method of claim 13, further comprising:
obtaining an overhead image of the identified third portion of the golf course; and
rendering an image of the heatmap overlaid on the overhead image of the third portion of the golf course as the third graphical representation.

* * * * *